US012774096B2

(12) United States Patent
Horner

(10) Patent No.: US 12,774,096 B2
(45) Date of Patent: Oct. 27, 2026

(54) THRUST RECOVERY VALVE SYSTEM

(71) Applicant: Honeywell International Inc., Charlotte, NC (US)

(72) Inventor: Darrell W. Horner, Oro Valley, AZ (US)

(73) Assignee: Honeywell International Inc., Charlotte, NC (US)

( * ) Notice: Subject to any disclaimer, the term of this patent is extended or adjusted under 35 U.S.C. 154(b) by 318 days.

(21) Appl. No.: 18/360,430

(22) Filed: Jul. 27, 2023

(65) Prior Publication Data

US 2025/0033779 A1 Jan. 30, 2025

(51) Int. Cl.
*B64D 13/02* (2006.01)
*F16K 31/04* (2006.01)

(52) U.S. Cl.
CPC ............ *B64D 13/02* (2013.01); *F16K 31/047* (2013.01)

(58) Field of Classification Search
CPC ..... B64D 13/02; F16K 31/047; F16K 47/045; B60H 1/00564; B60H 1/248; B60H 2001/006
See application file for complete search history.

(56) References Cited

U.S. PATENT DOCUMENTS 6,116,541 A 9/2000 Chuang et al.
7,198,062 B2 4/2007 Hoffman et al.
7,815,163 B2 10/2010 Siame et al.
7,878,457 B2 2/2011 Narramore
8,840,451 B2 9/2014 Royalty et al.
9,096,320 B2 8/2015 Horner et al.
9,464,532 B2 10/2016 Sutton
9,573,690 B2 2/2017 Horner et al.
9,783,306 B2 10/2017 Horner et al.
10,071,815 B2 9/2018 Tretow et al.
10,435,159 B2 10/2019 Loukusa
10,710,729 B2 7/2020 Krittian
2004/0238046 A1* 12/2004 Hoffman ............ F24F 13/1406 137/601.08

(Continued)

FOREIGN PATENT DOCUMENTS

CA 2699993 A1 2/2009
CN 115854112 A 3/2023
WO 2009019264 A2 2/2009

OTHER PUBLICATIONS

Extended Search Report from counterpart European Application No. 24186776.1 dated Dec. 11, 2024, 7 pp.

(Continued)

*Primary Examiner* — Michael G Hoang
*Assistant Examiner* — Brett P. Mallon
(74) *Attorney, Agent, or Firm* — Shumaker & Sieffert, P.A.

(57) ABSTRACT

In some examples, a thrust recovery valve system is configured to use an outflow valve to discharge a fluid flow from a cabin of an aircraft to an external environment surrounding the aircraft. The outflow valve may include a frame supported by a body of the aircraft and a gate configured to displace from the frame to define a flow passage for the discharge of the fluid follow. The thrust recovery valve system includes an obstacle configured to extend into the fluid flow in an extended position and retract from the fluid flow in a retracted position. In examples, the obstacle is configured to extend from and/or retract into a wall surface defined by the frame.

19 Claims, 8 Drawing Sheets

(56) References Cited

U.S. PATENT DOCUMENTS

| | | | | |
|---|---|---|---|---|
| 2010/0291852 | A1* | 11/2010 | Steinert | F16K 1/222 454/71 |
| 2013/0059517 | A1* | 3/2013 | Horner | B64D 13/02 454/71 |
| 2013/0186497 | A1 | 7/2013 | Royalty et al. | |
| 2016/0229540 | A1* | 8/2016 | Loukusa | B60H 1/00564 |
| 2017/0275012 | A1* | 9/2017 | Tretow | B64D 33/04 |

OTHER PUBLICATIONS

Response to Extended Search Report dated Dec. 11, 2024, from counterpart European Application No. 24186776.1 filed Mar. 3, 2025, 15 pp.

Notice of Intent to Grant and Text Intended to Grant from counterpart European Application No. 24186776.1 dated Nov. 6, 2025, 104 pp.

* cited by examiner

THRUST RECOVERY VALVE SYSTEM

TECHNICAL FIELD

The present disclosure relates to a thrust recovery valve system of an aircraft.

BACKGROUND

Aircraft often maintain cabin air pressure above the pressure of an outside atmosphere surrounding the aircraft during flight operation. During flight and other operations, aircraft systems (e.g., cabin pressure systems) may transfer air from the cabin to the outside atmosphere to maintain the cabin air pressure within a specified range, for the environmental control purposes, and/or for other reasons. Some aircraft may use a thrust recovery valve to control a rate at which at which air is transferred from the cabin to the outside atmosphere. In some aircraft, the thrust recovery valve is configured such that the air exhausted via the thrust recovery valve provides a forward thrust to the aircraft.

SUMMARY

The present disclosure describes articles, systems, and techniques relating to a thrust recovery valve system of an aircraft. The thrust recovery valve system may be configured to discharge an airflow from a cabin of the aircraft to an external environment surrounding the aircraft to maintain a cabin pressure within a desired range during flight operations and/or for other reasons. The thrust recovery valve system may discharge the airflow using an outflow valve. In examples, the outflow valve includes a frame mounted to a body of the aircraft (e.g., to a bulkhead of the aircraft) and a gate configured to displace from (e.g., pivot relative to) the frame to define a flow passage for the discharge of the airflow. The outflow valve may be configured to accelerate the airflow as the airflow flows through the flow passage. The thrust recovery valve system may be configured to transfer a thrust to the aircraft produced by the acceleration of the airflow. In examples, the gate is pivotably coupled and/or pivotably attached to the frame.

The acceleration of the airflow may be dependent on a differential pressure across the outflow valve as the airflow flows through the outflow valve. For example, differential pressure may cause the airflow to accelerate to a subsonic velocity, sonic velocity, or supersonic velocity. The thrust recovery valve system includes an obstacle configured to extend into the airflow in an extended position and retract from the airflow in a retracted position based on the differential pressure. For example, at lower differential pressures, the thrust recovery valve system may position the obstacle in the extended position to reduce and/or eliminate generation of tonal noise that might occur in the absence of the flow obstacle. At higher differential pressures, the thrust recovery valve system may position the obstacle in the retracted position to, for example, reduce generation of broadband noise that might otherwise occur in the presence of the flow obstacle. In examples, the obstacle is configured to extend from and/or retract into a wall surface defined by the frame, avoid a need for the to support the obstacle and/or an actuation motor associated with positioning the obstacle.

In an example, a system comprises: a valve comprising a gate, wherein the gate is configured to contact a frame when the valve is in a closed position and configured to displace away from the frame when the valve is in an open position, and wherein, in the open position, the valve defines a flow passage including an inflow portion of the flow passage and an outflow portion of the flow passage, the inflow portion configured to receive a fluid flow and the outflow portion configured to discharge the fluid flow; a wall surface, wherein the wall surface is configured to deliver the fluid flow to the inflow portion when the valve is in the open position and the fluid flow flows over the wall surface, and wherein the wall surface is configured to remain stationary with respect to the frame when the gate displaces from the frame; an obstacle configured to position in an extended position and position in a retracted position, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position; and control circuitry configured to: determine a pressure parameter, wherein the pressure parameter is indicative of a pressure of the fluid flow at the inflow portion compared to a pressure of the fluid flow at the outflow portion, cause the obstacle to position in the extended position when the pressure parameter is less than a parameter threshold, and cause the obstacle to position in the retracted position when the pressure parameter is greater than or equal to the parameter threshold.

In an example, a system comprises: a frame defining a wall surface; a valve comprising a gate pivotably coupled to the frame, wherein the valve is configured to seat against the frame when the valve is in a closed position and configured to displace away from the frame when the valve is in an open position, wherein, when the valve is in the open position, the gate and the frame are configured to define a flow passage including an inflow portion of the flow passage configured to receive an fluid flow and an outflow portion of the flow passage configured to discharge the fluid flow, wherein the gate and the frame are configured to accelerate the fluid flow to a supersonic speed when the outflow portion discharges the fluid flow, and wherein the wall surface is configured to deliver the fluid flow to the inflow portion when the valve is in the open position and the fluid flow flows over the wall surface; an obstacle configured to position in an extended position and configured to position in a retracted position, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position; and; an actuator system including a housing supporting a motor, the motor configured to cause the obstacle to position in the extended position and cause the obstacle to position in the retracted position, wherein the motor housing is coupled to the frame; and control circuitry configured to: determine a pressure parameter, wherein the pressure parameter is indicative of a pressure of the fluid flow at the inflow portion compared to a pressure of the fluid flow at the outflow portion, command the actuator system to the motor to position the obstacle in the extended position when the pressure parameter is less than a parameter threshold, and command the actuator system to the motor to position the obstacle in the retracted position when the pressure parameter is greater than or equal to the parameter threshold.

In an example, a method comprises: defining, using a valve, an inflow portion of a flow passage and an outflow portion of the flow passage by displacing a gate of the valve from a frame, wherein the gate is configured to seat against the frame when the valve is in a closed position and displace away from the frame when the valve is in an open position; delivering, using a wall surface, a fluid flow flowing over the wall surface to the inflow portion when the valve is in the open position; discharging, using the outflow portion, the fluid flow received at the inflow portion; determining, using control circuitry, a pressure parameter indicative of a pressure of the fluid flow at the inflow portion compared to a pressure of the fluid flow at the outflow portion; and causing, using the control circuitry, an obstacle to position in an extended position when the pressure parameter is less than a parameter threshold and position in a retracted position when the pressure parameter is greater than or equal to the parameter threshold, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position.

The details of one or more examples are set forth in the accompanying drawings and the description below. Other features, objects, and advantages will be apparent from the description and drawings, and from the claims.

DETAILED DESCRIPTION

Figure 1:
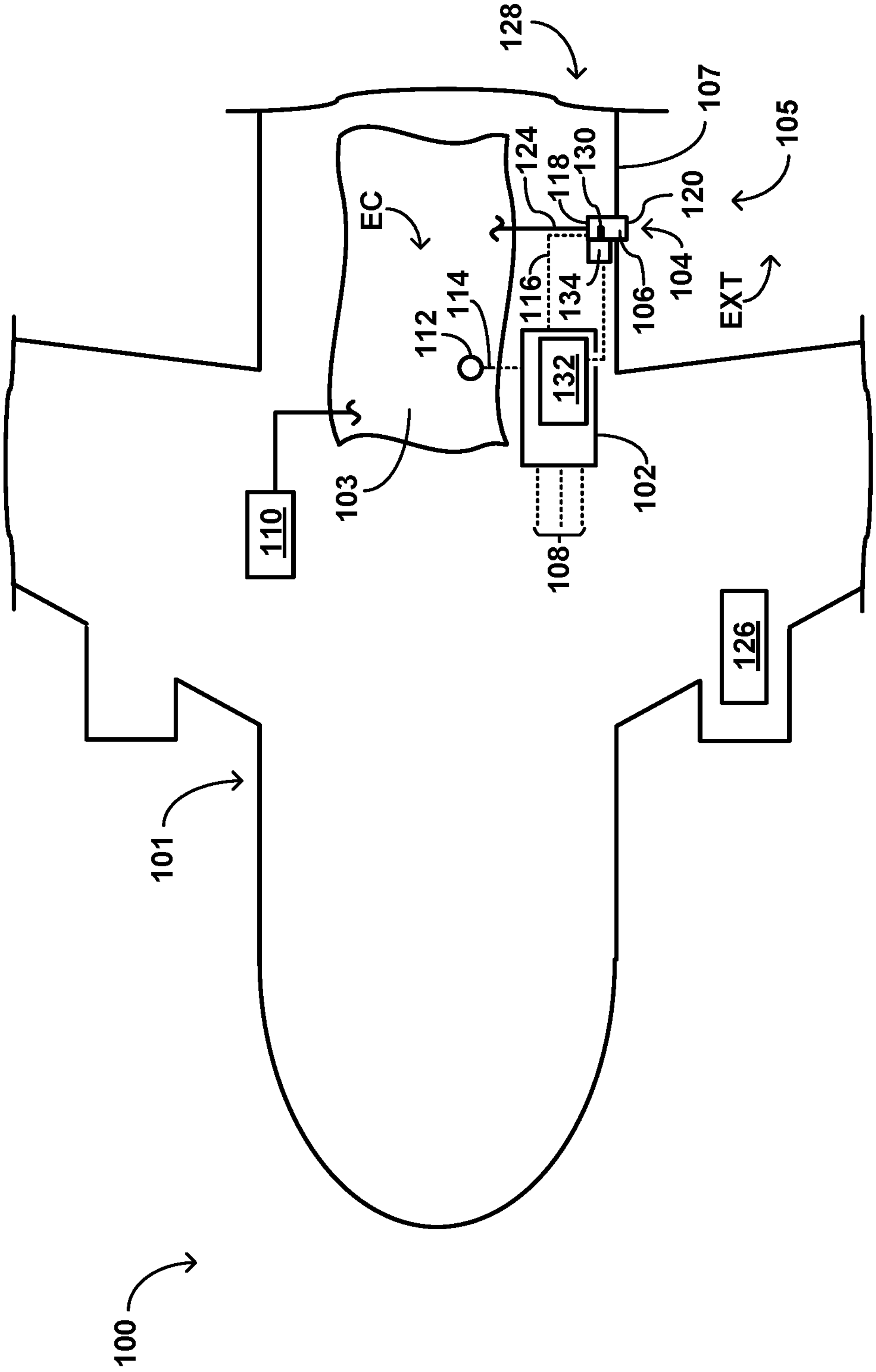
FIG. 1 is a perspective view illustrating an example thrust recovery valve system of an aircraft.

Aircraft often fly at altitudes necessitating pressurization of one or more aircraft cabins to simulate conditions at lower altitudes to, for example, facilitate the comfort of passengers and crew during flight. Typically, air is provided via an onboard system (e.g., a compressor side of a turbine engine, or another system) and conditioned by an environmental control system (ECS) before being provided to the cabin as a pressurized air flow. An internal pressure of the cabin may be controlled by a cabin pressure control system (CPCS) during flight and/or other operations of the aircraft. For example, at increased altitudes where external environments surrounding the aircraft may be thinner and less able or insufficient to support human life, the CPCS may control the cabin internal pressure to substantially simulate a higher pressure atmospheric condition found at lower altitudes. This enables the aircraft to simulate the conditions of lower altitudes (typically somewhere between 4,500 and 8,000 feet above sea level (ASL)) as the aircraft operates at the higher altitudes where the aircraft may be more efficient.

The aircraft may be required to discharge (e.g., vent) air from the relatively higher pressure cabin to the relatively lower pressure external environment (e.g., as the ECS provides air flow to the cabin) in order to maintain the cabin pressure within a desired range during flight operations and/or for other reasons. This air discharge may be driven (e.g., motivated to flow) at least in part by a differential pressure between the cabin and the external environment. This differential pressure is largely dependent on the altitude of the aircraft. For example, when the aircraft operates at higher altitudes, the differential pressure between the cabin and the external environment surrounding the aircraft is generally greater than when the aircraft operates at lower altitudes, due at least in part to the external environment becoming relatively thinner as the altitude increases. The CPCS may be configured to substantially control this air discharge (e.g., using one or more systems and/or aircraft components) based on the differential pressure experienced and/or expected during flight operations of the aircraft.

The CPCS may control one or more outflow valves configured to discharge the air flow from the cabin to the external environment surrounding the aircraft. For example, an outflow valve may be in fluidic communication with a conduit or other component and/or system at least partially defining a flow path for a fluid from the cabin to the external environment surrounding the aircraft. In some examples, the outflow valve is configured and/or positioned on the aircraft such that air exhausted from the cabin provides forward thrust to the aircraft. This forward thrust may be in addition to a forward thrust provided by an engine of the aircraft. In examples, the outflow valve is mounted on a bulkhead (e.g., an exterior skin) of the aircraft. Thus, the outflow valve may be one of several components and/or systems comprising a thrust recovery valve of the aircraft. In some examples, the outflow valve and/or other portions of the thrust recovery valve are generally located in a rear of the aircraft (e.g., a rear underbelly) proximate a tail of the aircraft.

In some examples, the outflow valve is configured to accelerate the air flow discharged from the cabin in order to enhance and/or facilitate the additional forward thrust to the aircraft. For example, the outflow valve may have a closed position wherein the outflow valve substantially blocks a fluid flow (e.g., an air discharge) from the cabin to the external environment and one or more open positions wherein the outflow valve allows the fluid flow from the cabin to the external environment. The outflow valve may be configured to substantially define a flow passage configured to accelerate the fluid flow when the outflow valve assumes an open position. The outflow valve may be configured such that the flow passage substantially acts as a nozzle when the outflow valve assumes the open position. For example, the outflow valve may be configured to at least partially define a convergent portion and/or a divergent portion of the flow passage in the open position. The outflow valve may be configured such that a differential pressure across the flow passage substantially determines the acceleration of the fluid flow achieved. Hence, when the outflow valve is in fluidic communication with the conduit or other component and/or system defining a flow path from the cabin to the external environment, the flow acceleration may be dependent at least in part on the altitude of the aircraft. For example, at higher altitudes, where the differential pressure may be greater, the flow passage may cause a greater acceleration of the fluid flow as the flow passage discharges the fluid to the external environment. At lower altitudes, where the differential pressure may be lower, the flow passage may cause a lower acceleration of the fluid flow as the flow passage discharges the fluid to the external environment.

The flow passage defined by the outflow valve may be configured such that, at lower differential pressures (e.g., lower aircraft altitudes), the flow discharging from the flow passage is a subsonic flow (e.g., a flow having a Mach number less 1.0). The flow passage may be configured such that the acceleration increases as the differential pressure increases (e.g., as the aircraft increases altitude). For example, the flow passage may be configured such that, at higher differential pressures (e.g., higher aircraft altitudes), the flow discharging from the flow passage is a sonic or supersonic flow (e.g., a flow having a Mach number equal to or greater than 1). Hence, as the aircraft increases or decreases altitude, the flow discharging from the flow passage may be a subsonic, sonic, or supersonic flow.

In some examples, the flow passage defined by the outflow valve may cause a flow noise under certain differential pressure conditions (e.g., when the discharging flow is subsonic). The flow noise may be, for example, a substantially tonal noise (e.g., a narrowband noise). At lower differential pressures, this tonal noise may propagate into the cabin and/or other portions of the aircraft, which may be bothersome to aircraft passengers and crew. At higher differential pressures, the increased exiting velocity of the discharged flow may substantially prevent the tonal noise from propagating into the cabin and/or the other portions. Hence, the outflow valve may be configured such that, at lower aircraft altitudes when the flow discharging from the flow passage may be subsonic, the tonal noise may propagate into the cabin and/or other portions of the aircraft. The outflow valve may be configured such that, at higher aircraft altitudes when the flow discharging from the flow passage may be supersonic, the exiting velocity of the discharged flow may substantially prevent the tonal noise from propagation into the cabin and/or other portions of the aircraft.

Some outflow valves incorporate a fixed obstruction element configured to reduce generation of a tonal noise at lower differential pressures across the outflow valve (e.g., during takeoff, climb, descent, and/or landing). The fixed obstruction element may be configured to cause a flow regime (e.g., a mitigation of flow separation) within the fluid flow to reduce the tonal noise generation. However, these fixed obstruction elements are generally configured to remain inserted within the fluid flow anytime the fluid flow accelerates through the outflow valve. Hence, the fixed obstruction element remains present within the flow (e.g., as a flow obstacle and/or a turbulence-inducing element) regardless of the differential pressure across the outflow valve. Stated similarly, the fixed obstruction device may be configured to remain inserted within the fluid flow during a full flight regime of an aircraft. This can result in increased broadband noise even under conditions when tonal noise might generally fail to propagate into the cabin and/or other portions of the aircraft. For example, the fixed obstruction element may generate increased broadband noise at higher aircraft altitudes when a differential pressure across the outflow valve is relatively higher, such as at an aircraft cruising altitude. This increased broadband noise may be bothersome and/or detrimental to aircraft passengers and crew over the course of an aircraft flight.

The system disclosed herein includes a thrust recovery valve system having an obstruction system configured to reduce and/or eliminate a propagation of tonal noise into the cabin and/or other portions of the aircraft caused by a discharge of a fluid flow (e.g., a discharge of an airflow from the cabin). The thrust recovery valve system includes an outflow valve comprising a gate configured to seat against a frame in a closed position of the valve and configured to displace away from the frame in an open position of the valve. In examples, the frame is configured to be supported by a portion of an aircraft body such that, for example, the frame is substantially stationary relative to the portion of the aircraft body. The gate may be configured to move relative to the portion of the aircraft body and the frame when the gate displaces from the frame and the outflow valve transitions to one or more open positions. In examples, the gate is rotatably coupled to the frame, such that the gate rotates relative to the frame as the gate moves relative to the portion of the aircraft body and the frame.

In the open position, the outflow valve (e.g., at least the gate) is configured to define a flow passage having an inflow portion and an outflow portion. The outflow valve is configured to accelerate a fluid flow as the outflow valve receives the fluid flow at the inflow portion and discharges the fluid flow at the outflow portion. The outflow valve may be configured such that a velocity of the fluid flow discharging from the outflow portion is dependent at least in part on a differential pressure of the fluid from the inflow portion to the outflow portion. Hence, when the inflow portion is fluidically coupled to a cabin of an aircraft and the outflow portion is fluidically coupled to an external environment surrounding the aircraft, the outflow valve may be configured such that the velocity of the fluid flow discharging from the outflow portion increases as an altitude of the aircraft increases (e.g., as the differential pressure increases). The outflow valve may be configured such that the velocity of the fluid flow discharging from the outflow portion decrease as the altitude of the aircraft decrease (e.g., as the differential pressure decreases).

The thrust recovery valve system includes an obstruction system configured to reduce and/or eliminate a generation of tonal noise as the fluid flow accelerates through the flow passage defined by the outflow valve while. The obstruction system is configured to extend an obstacle into the fluid flow (e.g., to provide a flow obstacle in the fluid flow) and configured to retract the obstacle from the fluid flow (e.g., to remove and/or minimize the flow obstacle in the fluid flow). For example, at lower differential pressures (e.g., when the discharging flow may be subsonic), the obstruction system may extend the obstacle to reduce and/or eliminate generation of tonal noise that might occur in the absence of the flow obstacle. At higher differential pressures (e.g., when the discharging flow may be sonic or supersonic), the obstruction system may retract the obstacle to, for example, reduce generation of broadband noise that might otherwise occur in the presence of the flow obstacle.

In examples, the thrust recovery valve system includes a wall surface configured to deliver the deliver the fluid flow to the outflow valve. For example, the thrust recovery valve system may be configured such that the fluid flow flows over the wall surface when the outflow valve receives the fluid flow. In examples, the wall surface is configured to be supported by a portion of an aircraft body (e.g., the portion supporting the frame of the thrust recovery valve system) such that the wall surface is substantially stationary relative to the portion of the aircraft body. In examples, the frame of the thrust recovery valve system defines the wall surface. The obstruction system may be configured to extend the obstacle from the wall surface into the fluid flow and configured to retract the obstacle into the wall surface from the fluid flow. In examples, the obstacle defines an obstacle surface configured to substantially align (e.g., be substantially flush) with the wall surface when the obstruction system retracts the obstacle, such that the obstruction surface and the wall surface define a substantially smooth surface when the obstruction is in a retracted position.

The thrust recovery valve system includes control circuitry configured to cause the obstruction system to extend and/or retract the obstacle. The control circuitry is configured to cause the obstruction system to position the obstacle in the extended position when a pressure parameter is less than a parameter threshold. The control circuitry is configured to cause the obstruction system to position the obstacle in the retracted position when the pressure parameter is greater than or equal to the parameter threshold. In examples, the parameter threshold is indicative of a differential pressure and/or pressure ratio of the fluid flow across the flow passage defined by the gate when the outflow valve is in an open position. In some examples, the parameter threshold is indicative of a ratio of a pressure of the fluid flow at the inflow portion to a pressure of the fluid flow at the outflow portion. In examples, the parameter threshold is indicative of a ratio of the pressure of the fluid flow at the inflow portion divided by the pressure of the fluid flow at the outflow portion. For example, the parameter threshold may be indicative of a range of ratios which includes a ratio of about 1.87.

In examples, the thrust recovery valve system includes an actuator system which includes a motor and a motor housing supporting the motor. The motor may be configured to cause the obstruction system to position the obstacle in the extended position and/or in the retracted position. In examples, the motor housing is configured to remain substantially stationary relative to the wall surface when the motor causes the obstruction system to position the obstacle in the extended position and/or in the retracted position. In some examples, the frame of the thrust valve recovery system supports the motor housing. Hence, the thrust valve recovery system may be configured such that the obstacle (e.g., when in the extended position and/or the retracted position), the motor housing, and the frame of the thrust recovery system are configured to remain substantially stationary with respect to a portion of the aircraft body supporting the frame. This may avoid a need for a gate of the outflow valve to support the obstacle and/or the motor, reducing and/or eliminating a need for electrical and/or other connections to move relative to the aircraft body when the gate displaces from the frame.

FIG. 1 is a schematic illustration of a portion of an aircraft 100 including an aircraft body 101. Aircraft 100 includes a cabin 103 and a cabin pressure control system 102 (CPCS 102). Cabin 103 may be, for example, a passenger cabin or some other portion of aircraft 100. CPCS 102 may be configured to control and/or regulate a pressure within cabin 103 during flight and other operations of aircraft 100. In examples, CPCS 102 is configured to substantially control a discharge of a fluid (e.g., air) from a cabin atmosphere EC within cabin 103 to an external environment EXT surrounding aircraft body 101. Aircraft 100 may be configured to separate cabin 103 and external environment EXT using some portion of aircraft body 101, such as a bulkhead 107 (e.g., an aircraft exterior skin).

Aircraft 100 may include an environmental control system 110 ("ECS 110") configured to provide a fluid flow (e.g., a pressurized air flow) to cabin 103. ECS 110 may be configured to provide the fluid flow from one or more compressor stages of an aircraft engine 126 supported by aircraft body 101, an electric air compressor, a turbo-compressor, and/or another fluid source configured to provide the fluid flow (e.g., an air flow) to ECS 110. CPCS 102 may control and/or modulate one or more valves such as outflow valve 106 to exhaust and/or vent a fluid (e.g., air) from cabin 103 to control a pressure of cabin 103 as ECS 110 provides the fluid flow to cabin 103.

Aircraft 100 includes a thrust recovery valve system 104 ("TROV system 104") including an outflow valve 106. Outflow valve 106 is configured to receive a fluid flow (e.g., an airflow) from cabin 103 and discharge the fluid flow to external environment EXT. As discussed in further detail below, TROV system 104 further includes an obstruction system 128. Obstruction system 128 includes an obstacle 130 configured to extend into a flow path of fluid flowing through outflow valve 106 in an extended position, and configured to at least partially retract from the flow path of the fluid flowing through outflow valve 106 in a retracted position. In examples, TROV system 104 includes an actuator system 134 which includes a motor and a motor housing supporting the motor (e.g., actuator motor 168, actuator housing 170 (FIG. 2)). The motor may be configured to cause obstruction system 128 to position obstacle 130 in the extended position and/or in the retracted position.

In FIG. 1, cabin 103 is schematically illustrated as a portion of a cabin of aircraft 101 which may extend within and/or throughout aircraft 101 to a greater or lesser degree than is illustrated in FIG. 1. For example, in some examples, cabin 103 may extend substantially to TROV system 104 and/or bulkhead 107.

In examples, the motor housing is configured to remain substantially stationary relative to a wall surface (e.g., wall surface 139 (FIG. 2) supported by aircraft body 101 when the motor causes obstruction system 128 to position obstacle 130. In some examples, a frame (e.g., frame 138 (FIG. 2)) defines the wall surface 139. In some examples, the frame supports the motor housing. Hence, the TROV 104 may be configured such that obstacle 130 (e.g., when in the extended position and/or the retracted position), the motor housing, and the frame are configured to remain substantially stationary with respect to a portion of the aircraft body supporting the frame. This may avoid a need for a moving portion of outflow valve 106 (e.g., gate 136 (FIG. 2)) to support the obstacle, the motor, and/or the motor housing, and/or reduce and/or eliminating a need for electrical and/or other connections to move relative to aircraft body 101 when outflow valve 106 transitions between a closed position and an open position.

CPCS 102 may be configured to direct and/or command operation of outflow valve 106. In examples, aircraft 100 includes a valve operation system (e.g., valve operation system 146 (FIG. 2)) coupled (e.g., mechanically coupled) to outflow valve 106. CPCS 102 may be configured to command the positioning system to move outflow valve 106 to various positions to control and/or regulate a pressure of an atmosphere within cabin 103 (e.g., an air atmosphere). In examples, CPCS 102 and/or TROV system 104 includes one or more sensors such as pressure sensor 112 configured to sense a pressure within cabin 103 (e.g., a pressure of cabin atmosphere EC). Pressure sensor 112 may be configured to provide a pressure signal indicative of the pressure to CPCS 102 and/or TROV system 104. For example, pressure sensor 112 may be configured to communicate the pressure signal to CPCS 102 and/or TROV system 104 via communication link 114. CPCS 102 may be configured to command the positioning system via communication link 116 to move outflow valve 106.

In examples, CPCS 102 is configured to receive one or more inputs such as inputs 108 in addition to or instead of the pressure signal from pressure sensor 112. CPCS may be configured to determine and/or detect a flight posture of aircraft 100 using inputs 108. For example, inputs 108 may include one or more inputs provided by an air data system (not shown) of aircraft 100, a landing gear system (not shown) of aircraft 100, and/or other systems of aircraft 100. CPCS may be configured to use inputs 108 to detect and/or determine an altitude of aircraft 100, a climb and/or rate of climb of aircraft 100, a descent and/or rate of descent of aircraft 100, whether aircraft 100 is in flight or on the ground, an ambient pressure of external environment EXT and/or expected changes to the ambient pressure of external environment EXT, an airspeed to aircraft 100, a number of passengers in cabin 103, an angle-of-attack of aircraft 100 relative to external environment EXT, and/or other parameters descriptive of a flight posture of aircraft 100.

CPCS 102 may be configured to command the positioning system to move outflow valve 106 based on a predetermined schedule, as a function of one or more parameters determined and/or described by inputs 108 and/or pressure sensor 112, and/or for other reasons. Further, inputs 108 may include one or more signals from one or more temperature sensors, one or more cabin-to-atmosphere differential pressure sensors, one or more atmospheric pressure sensors, one or more atmospheric temperature sensors, one of more position sensors (e.g., position sensor 204 (FIG. 8)), and/or others. In examples, CPCS 102 is configured to determine a pressure differential between cabin 103 and external environment EXT (e.g., via a comparator). CPCS 102 may be configured to position outflow valve 106 (and/or other outflow valves) to control and/or modulate a rate (e.g., a mass flow rate) at which fluid (e.g., air) is transferred from cabin 103 to external environment EXT to control the pressure (e.g., an air pressure) within cabin 103.

Outflow valve 106 includes an inlet portion 118 and an outlet portion 120. Outflow valve 106 is configured to define a flow path for a fluid (e.g., a gas such as air) from inlet portion 118 to outlet portion 120. Outflow valve 106 is configured to establish an open position wherein a fluid may flow through outflow valve 106 via the flow path defined by outflow valve 106 from inlet portion 118 to outlet portion 120. Outflow valve 106 is configured to define a closed position wherein fluid flow from inlet portion 118 to outlet portion 120 is substantially blocked and/or restricted. In examples, outflow valve 106 includes a valve element (e.g., gate 136) configured to control the fluid flow flowing through the flow path defined from inlet portion 118 to outlet portion 120. The valve element may be configured to move relative to portions of aircraft body 101 and/or a body of outflow valve 106 (e.g., frame 138) when outflow valve 106 transitions between the open position and the closed position, or vice-versa.

Inlet portion 118 may be configured to fluidically couple to cabin atmosphere EC within cabin 103 (e.g., via a conduit 124 defined by outflow valve 106 and/or another portion of aircraft 100). Outflow portion 120 may be configured to fluidically couple to external environment EXT. For example, in the open position, outflow valve 106 may be configured to receive a fluid flow from cabin 103 using inlet portion 118 and discharge the fluid flow to external environment EXT via outlet portion 120. In the closed position, outflow valve 106 may be configured to substantially block and/or restrict a fluid flow from cabin 103, such that discharge of fluid flow to external environment EXT is restricted and/or substantially prevented. Thus, during flight and other aircraft operations, a pressure in cabin 103 and/or other portion of aircraft 100 may be controlled by positioning outflow valve 106. For example, CPCS 102 may direct the positioning of outflow valve 106 to commence, adjust, and/or cease a flow of the fluid (e.g., air) from cabin atmosphere EC to external environment EXT.

In examples, outflow valve 106 is configured to define a plurality of open positions. Outflow valve 106 may be configured such that the fluid flow may flow through the defined flow path from inlet portion 118 to outlet portion 120 in each of the plurality of open positions. Hence, when outflow valve 106 is described herein as establishing and/or otherwise being positioned in an open position, this may refer to any open position in the plurality of open positions.

TROV system 104 may be configured and/or positioned on aircraft 100 so that outflow valve 106 provides and/or imparts thrust (e.g., a forward thrust) to aircraft body 101 when outflow valve 106 defines the flow path from inlet portion 118 to outlet portion 120 (e.g., when outflow valve 106 is in the open position). The thrust provided by outflow valve 106 may be, for example, in addition to a thrust provided by engine 126. In examples, outflow valve 106 is mounted on bulkhead 107 such that inlet portion 118 is fluidically coupled to cabin 103 and outlet portion 120 is fluidically coupled to external environment EE. In some examples, outflow valve 106 and/or other portions of TROV system 104 are located in a rear of aircraft 100 (e.g., a rear underbelly) proximate a tail of aircraft 100.

Outflow valve 106 may be configured to accelerate the fluid flow received (e.g., from cabin 103) by inlet portion 118 and discharged from outlet portion 120 to, for example, enhance and/or facilitate the thrust imparted to aircraft body 101. In examples, when outflow valve 106 establishes an open position, outflow valve 106 is configured to define a flow passage configured to accelerate the fluid flow received by inlet portion 118 and discharged by outlet portion 120. For example, outflow valve 106 may be configured to at least partially define a convergent section (e.g., convergent section 163 (FIG. 3)) of the flow passage and/or a divergent section of the flow passage (e.g., divergent section 165 (FIG. 3)). Outflow valve 106 may be configured such that a differential pressure across outflow valve 106 (e.g., across the defined flow passage) substantially determines at least the acceleration of the fluid flow achieved. Hence, when inlet portion 118 is in fluidic communication with cabin 103 and outlet portion 120 is in fluidic communication with external environment EXT, a flow acceleration achieved by outflow valve 106 in the open position may be dependent at least in part on an altitude of aircraft 100. Thus, as aircraft 100 increases or decreases altitude, the fluid flow discharging from outflow valve 106 may be a subsonic, sonic, or supersonic.

Aircraft 100 includes obstruction system 128 configured to modify and/or alter a flow path of a fluid flow flowing through outflow valve 106 from inlet portion 118 to outlet portion 120. In examples, obstruction system 128 includes obstacle 130 configured to alter the flow path of the fluid flow flowing through outflow valve 106. In examples, obstacle 130 is configured to establish an extended position and a retracted position. Obstacle 130 may be configured to insert at least a portion of obstacle 130 into a flow path of the fluid flow flowing through outflow valve 106 in the extended position. Obstacle 130 may be configured to retract the portion of obstacle 130 from the flow path of the fluid flow flowing through outflow valve 106 in the retracted position. Obstruction system 128 is configured to cause obstacle 130 to position in the extended position, position in the retracted position, and/or transition between the extended position and the retracted position.

In examples, obstacle 130 is configured to act as a flow obstacle in the flow path of the fluid flow flowing through outflow valve 106. For example, when obstruction system 128 extends obstacle 130 into the flow path of the fluid flow, obstacle 130 may cause the fluid flow to establish a velocity vector field wherein one or more streamlines and/or pathlines avoid and/or flow around obstacle 130 (e.g., flow around a space occupied by obstacle 130). When obstruction system 128 retracts obstacle 130 from the flow path of the fluid flow flowing through outflow valve 106, the retraction may enable and/or cause the fluid flow to establish a velocity vector field wherein one or more streamlines and/or pathlines flow through the space previously occupied by obstacle 130. Obstacle 130 may be configured to insert into the flow path of the fluid flow flowing through outflow valve 106 at any location in the flow path of the fluid flow. For example, when the fluid flow flows through outflow valve 106 in a downstream direction from inlet portion 118 to outlet portion 120, obstacle 130 may be configured to insert into the flow path of the fluid flow at a location upstream of inlet portion 118 and/or downstream of inlet portion 118.

In examples, obstacle 130 is configured to reduce generation of a tonal noise when the fluid flow flows through outflow valve 106 (e.g., at lower differential pressures across outflow valve 106, such as during takeoff, climb, descent, and/or landing). Obstacle 130 may be configured to reduce generation of a broadband noise when the fluid flow flows through outflow valve 106 (e.g., at higher differential pressures across outflow valve 106, such as during such as at an aircraft cruising altitude). For example, in the extended position, obstacle 130 may be configured to extend into the fluid flow to cause a flow regime (e.g., a mitigation of flow separation) within the fluid flow flowing through outflow valve 106 to reduce and/or mitigate the tonal noise generation. In the retracted position, obstacle 130 may be configured to substantially retract from the fluid flow to reduce and/or mitigate generation of broadband noise that might otherwise generate were obstacle 130 to remain in the extended position.

TROV system 104 includes control circuitry 132 configured to cause obstruction system 128 to position obstacle 130 in the extended position, configured to cause obstruction system 128 to position obstacle 130 in the retracted position, and/or cause obstruction system 128 to transition obstacle 130 between the extended position and the retracted position. Control circuitry 132 is configured to cause obstruction system 128 to position obstacle 130 based on a pressure parameter. In some examples, control circuitry 132 may be some portion of CPCS 102. In some examples, control circuitry 132 may be substantially separate from CPCS 102.

The pressure parameter may be indicative of a differential pressure across outflow valve 106. In examples, the pressure parameter is indicative of a differential pressure from inlet portion 118 to outlet portion 120 when a fluid flows from inlet portion 118 to outlet portion 120. Control circuitry 132 may be configured to cause obstruction system 128 to position obstacle 130 in the extended position when the pressure parameter indicates a relatively lower differential pressure across outflow valve 106 to, for example, reduce generation of a tonal noise. Control circuitry 132 may be configured to cause obstruction system 128 to position obstacle 130 in the retracted position when the pressure parameter indicates a relatively higher differential pressure across outflow valve 106 to, for example, reduce generation of a broadband noise. In examples, the pressure parameter is indicative of a differential pressure and/or pressure ratio from inlet portion 118 to outlet portion 120 when a fluid flows from inlet portion 118 to outlet portion 120. For example, the differential pressure may be indicative of a difference between a pressure within cabin 103 and a pressure of external environment EXT.

Control circuitry 132 may be configured to determine the pressure parameter from one of more inputs provided by, for example, pressure sensor 112 and/or CPCS 102. For example, control circuitry may determine the pressure parameter using the pressure signal provided by pressure sensor 112 and/or one or more of the inputs 108 provided to CPCS 102. In some examples, CPCS 102 may determine the pressure parameter using one of more of inputs 108 and/or the pressure signal provided by pressure sensor 112. Control circuitry 132 may be configured to receive the pressure parameter from CPCS 102 to determine the pressure parameter.

In examples, control circuitry 132 is configured to cause obstruction system 128 to position obstacle 130 based on a comparison of the pressure parameter and a parameter threshold. For example, control circuitry 132 may be configured to cause obstruction system 128 to position obstacle 130 in the extended position when the pressure parameter is less than the parameter threshold. Control circuitry 132 may be configured to cause obstruction system 128 to position obstacle 130 in the retracted position when the pressure parameter is greater than or equal to the parameter threshold.

In examples, the parameter threshold is indicative of a differential pressure and/or pressure ratio across outflow valve 106. For example, the parameter threshold may be indicative of a differential pressure across the flow passage defined by outflow valve 106 when outflow valve 106 is in the open position. In some examples, the parameter threshold is indicative of a ratio of a pressure of a fluid at an inflow portion of the defined flow passage to a pressure of the fluid at an outflow portion of the defined flow passage. For example, the parameter threshold may be indicative of a range of ratios which includes a ratio of about 1.87. In some examples, the range of ratios includes one or more ratios within plus or minus 5% of 1.87. In some examples, the range of ratios includes one or more ratios within plus or minus 10% of 1.87, plus or minus 20% of 1.87, or plus or minus 30% of 1.87.

Figure 2:
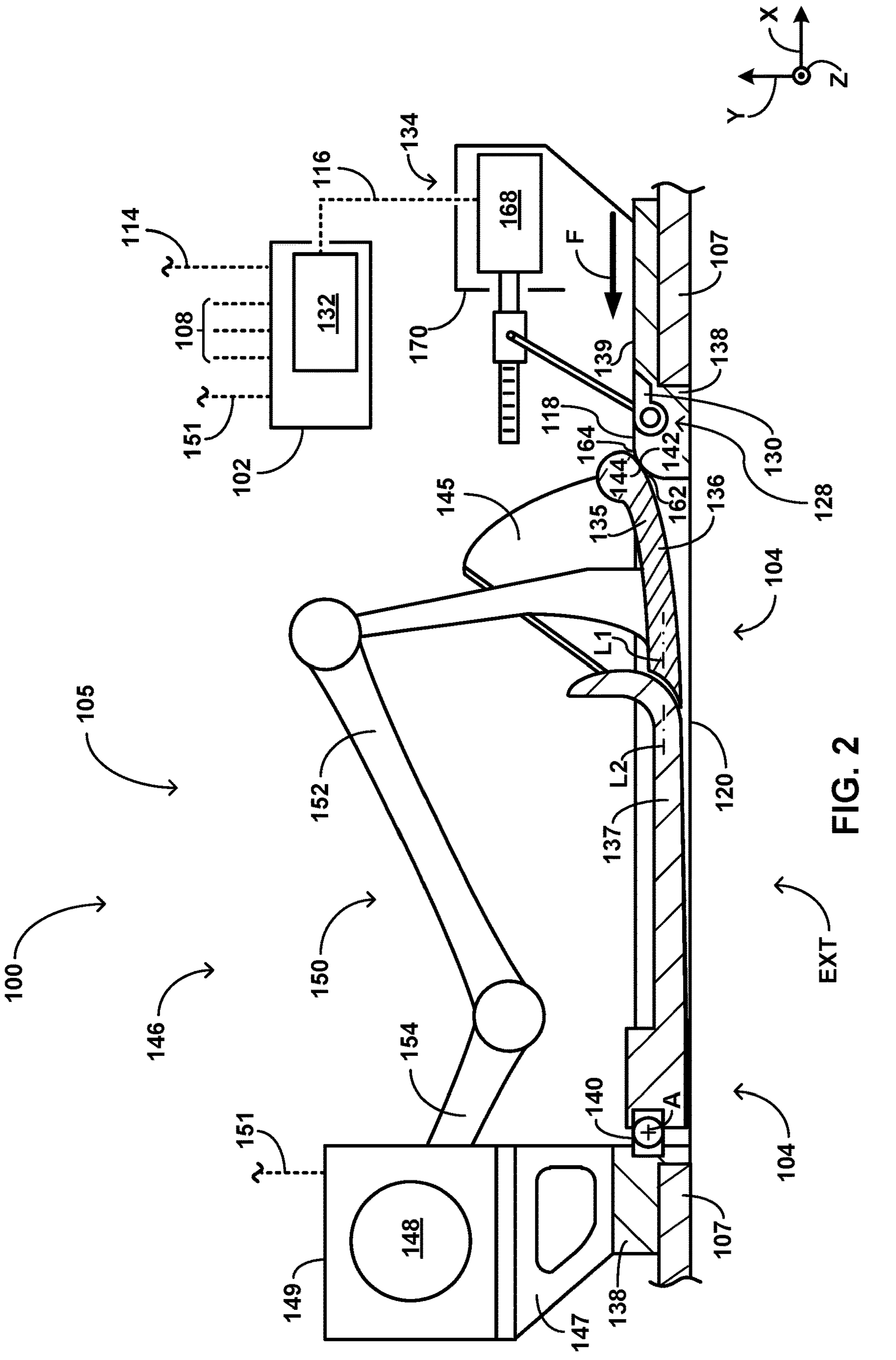
FIG. 2 is a schematic cross-sectional view illustrating an outflow valve of a thrust recovery valve system in a closed position.
Figure 3:
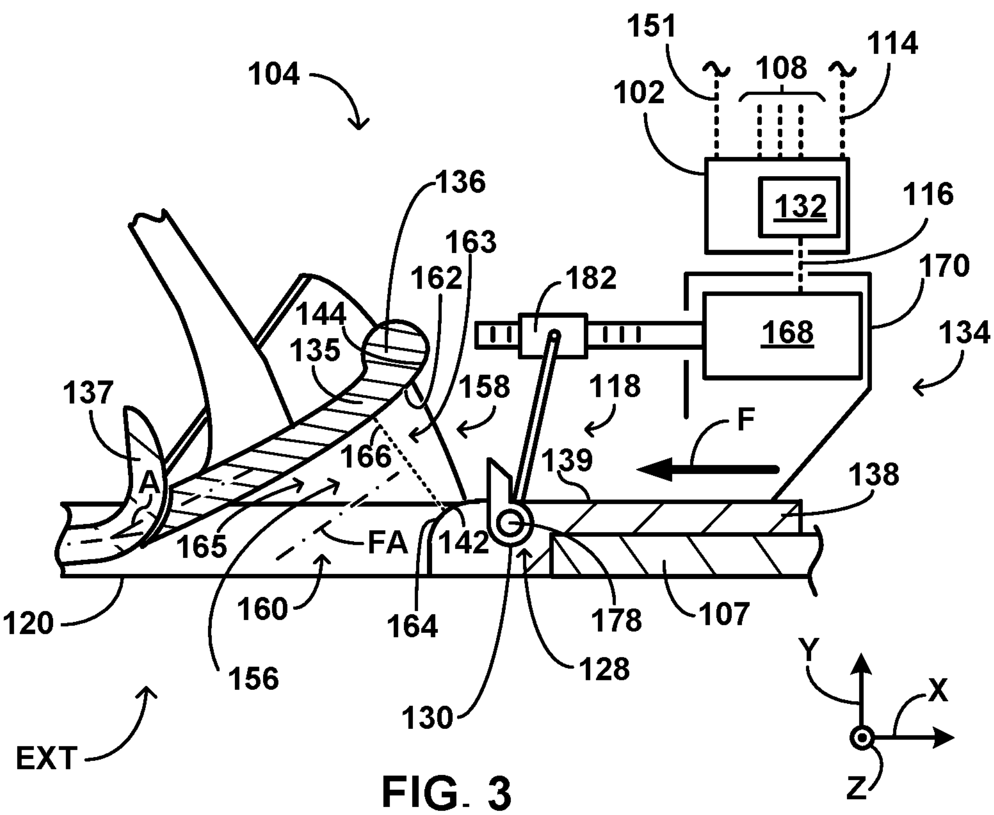
FIG. 3 is a schematic plan view illustrating the outflow valve of FIG. 2 in an open position and an obstacle of the thrust recovery valve system in an extended position.
Figure 4:
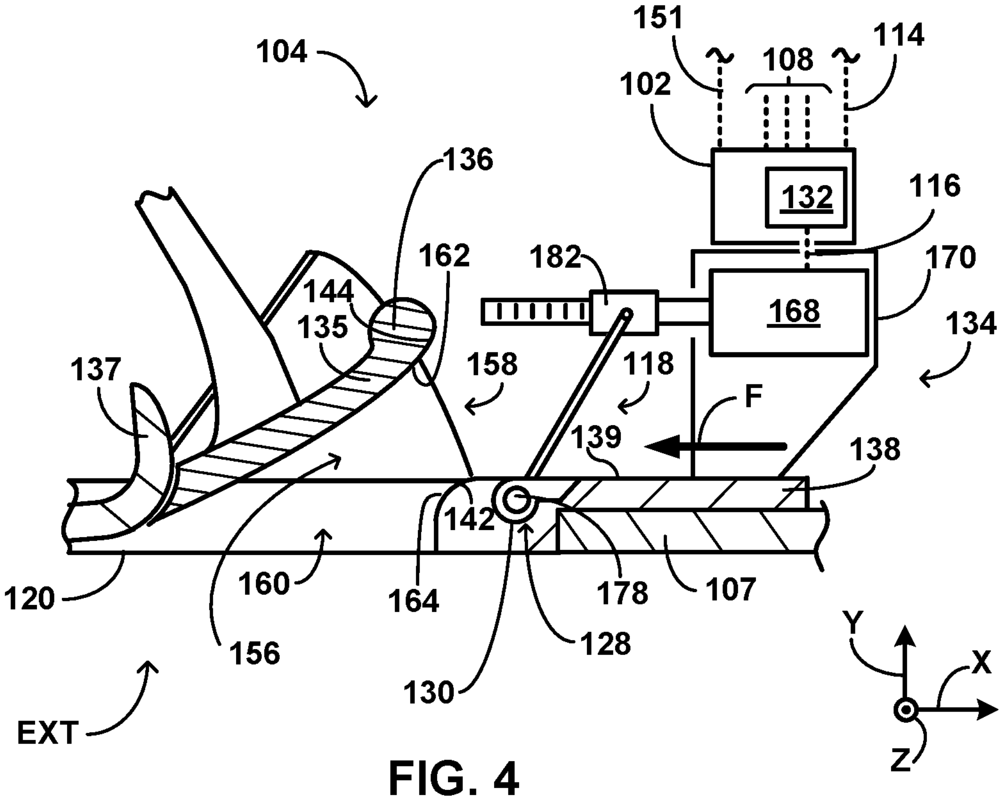
FIG. 4 is a schematic plan view illustrating the outflow valve of FIG. 2 and FIG. 3 in an open position and the obstacle of the thrust recovery valve system in a retracted position.

FIG. 2 is a schematic illustration of TROV system 104 including outflow valve 106, obstruction system 128 including obstacle 130, actuator system 134, and control circuitry 132. Outflow valve 106 includes a gate 136 and a frame 138. In FIG. 2, outflow valve 106 is in the closed position and obstacle 130 is in the retracted position. FIG. 3 is a schematic illustration of a portion of TROV system 104 with outflow valve 106 in the open position and obstacle 130 in the extended position. FIG. 4 is a schematic illustration of the portion of TROV system 104 with outflow valve 106 in the open position and obstacle 130 in the retracted position. In FIG. 2, FIG. 3, and FIG. 4, portions of gate 136, frame 138, and bulkhead 107 are illustrated as cross-sections, with a cutting plane taken parallel to the page.

As discussed above and further discussed below, gate 136 may be configured to seat against (e.g., contact and/or engage) frame 138 when outflow valve 106 is in the closed position, and may be configured to displace from frame 138 when outflow valve 106 is in the open position. TROV system 104 defines a wall surface 139 configured to deliver a fluid flow F to outflow valve 106 when outflow valve 106 is in the open position. In examples, frame 138 defines wall surface 139. Frame 138 may be configured to be mounted to a portion of aircraft body 101, such as bulkhead 107 and/or another portion of aircraft body 101. Hence, when gate 136 displaces from frame 138 to position in the open position, frame 138 and/or wall surface 139 may remain substantially stationary relative to bulkhead 107 and/or the other portion of aircraft body 101.

TROV system 104 includes an obstacle 130 configured to establish an extended position (as depicted in FIG. 3) and a retracted position (as depicted in FIG. 4). Obstacle 130 may be configured to extend from wall surface 139 into a flow path of fluid flow F in the extended position. Obstacle 130 may be configured to at least partially retract into wall surface 139 in the retracted position. Hence, TROV system 104 may be configured such that, when obstacle 130 is in the extended position or in the retracted position and gate 136 moves relative to frame 138 (e.g., to open or adjust an open position), obstacle 130 may remain substantially stationary with respect to frame 138. This may avoid a need for a moving portion of outflow valve 106 (e.g., gate 136) to support obstacle 130 and or portions of an actuation system, eliminating a need for electrical and/or other connections to move relative to aircraft body 101 when outflow valve 106 transitions between a closed position and an open position and/or CPCS 102 modulates a position of outflow valve 106 to control a pressure within cabin 103.

Control circuitry 132 is configured to cause obstacle 130 to position in and/or transition between the extended position and the retracted position based on a pressure parameter. In examples, the pressure parameter is indicative of a differential pressure across outlet valve 106. In examples, the differential pressure is indicative of a difference in pressure from inlet portion 118 to outlet portion 120 and/or a difference between a pressure within cabin 103 and a pressure of external environment EXT. In examples, control circuitry 132 is configured to cause obstacle 130 to position in the extended position when the pressure parameter indicates a relatively lower differential pressure across outflow valve 106 to, for example, reduce generation of a tonal noise. Control circuitry 132 may be configured to cause obstruction system 128 to position obstacle 130 in the retracted position when the pressure parameter indicates a relatively higher differential pressure across outflow valve 106 to, for example, reduce generation of a broadband noise.

In examples, obstacle 130 is configured to move (e.g., to rotate) relative to wall surface 139 when obstacle 130 transitions between the extended position and the retracted position. Obstacle 130 may be configured to substantially align with wall surface 139 in the retracted position (e.g., FIG. 2, FIG. 4), such that a surface of obstacle 130 is substantially flush with wall surface 139. In some examples, TROV system 104 includes an actuator system 134 configured to cause obstacle 130 to position in and/or transition between the extended position and the retracted position. At least some portion of actuator system 134 may be supported by an actuator housing 170 configured to remain stationary relative to frame 138 when gate 136 displaces from frame 138.

Gate 136 is configured to seat against (e.g., contact and/or engage) frame 138 when outflow valve 106 is in the closed position. In the closed position, outflow valve 106 is configured to substantially block and/or restrict a fluid flow F from cabin 103 (e.g., from cabin atmosphere EC), such that discharge of the fluid flow F to external environment EXT is restricted and/or substantially prevented. For example, when gate 136 is seated against frame 138, gate 136 may be configured to restrict and/or substantially prevent a discharge of the flow F from cabin atmosphere EC to external environment EE.

Frame 138 is configured to be mounted to a portion of aircraft body 101, such as bulkhead 107 and/or another position of aircraft body 101. In examples, frame 138 defines a frame sealing edge 142. Gate 136 may define a gate sealing edge 144. Outflow valve 106 may be configured such that gate sealing edge 144 engages frame sealing edge 142 when outflow valve 106 is in the closed position. The gate sealing edge 144 and/or frame sealing edge 142 may be configured to substantially block and/or restrict the fluid flow F from flowing from inlet portion 118 to outlet portion 120 when gate sealing edge 144 engages frame sealing edge 142. TROV system 104 and/or frame 138 may be configured such that frame 138 is substantially stationary relative to the portion of aircraft body 101 when outflow valve 106 is in the closed position, the open position, and/or transitions between the closed position and the open position.

Gate 136 is configured to move relative to frame 138 when gate 136 transitions between the closed position of FIG. 2 and the open position of FIG. 3. For example Gate 136 may be configured to displace in a direction away from frame 138 when outflow valve 106 transitions from the closed position (e.g., as depicted in FIG. 2) to the open position (e.g., as depicted in FIG. 3). In examples, gate sealing edge 144 is configured to displace from frame sealing edge 142 when outflow valve is in the open position. In the open position, outflow valve 106 may be configured to receive a fluid flow from cabin 103 (e.g., from cabin atmosphere EC) using inlet portion 118 and discharge the fluid flow to external environment EXT via outlet portion 120. TROV system 104 and/or frame 138 may be configured such that frame 138 is substantially stationary relative to a portion of aircraft body 101 (e.g., a portion of bulkhead 107) when outflow valve 106 is in the closed position, the open position, and/or transitions between the closed position and the open position.

In some examples, gate 136 includes a first portion 135 ("first gate portion 135") and a second portion 137 ("second gate portion 137"). In examples, gate 136 is configured such that first gate portion 135 and second gate portion 137 move relative to frame 138 when outflow valve 106 transitions between the closed position and the open position. In examples, second gate portion 137 is rotatably coupled to frame 138 via support element 140. In some examples, first gate portion 135 is configured to move relative to second gate portion 137 when gate 136 moves relative to frame 138. For example, first gate portion 135 may be rotatably coupled, slidably coupled, and/or otherwise hinged to second gate portion 137. In some examples, first gate portion 135 defines a first linear axis L1 and second gate portion 137 defines a second linear axis L2. Gate 136 may be configured such that second linear axis L2 is parallel and/or coincident with first linear axis L1 when outflow valve 106 is in the closed position (as depicted in FIG. 2). Gate 136 may be configured such that (e.g., due to relative motion between first gate portion 135 and second gate portion 137) second linear axis L2 and first linear axis L1 intersect to define a vertex angle A when outflow valve 106 is in the open position (as depicted in FIG. 3). Stated similarly, gate 136 may be configured such that first linear axis L1 and second linear axis L2 are parallel and/or coincident when outflow valve 106 is in the closed position, and such that first linear axis L1 and second linear axis L2 are non-parallel when outflow valve 106 is in the open position.

TROV system 104 (e.g., outflow valve 106) may include one or more shields such as shield 145 configured to assist in channeling the flow F between gate 136 and frame 138 when outflow valve 106 is in the open position. Frame 138 may be configured to support shield 145. In examples, shield 145 is configured to remain substantially stationary relative to frame 138 when outflow valve 106 transitions between the closed position and the open position (e.g., when gate 136 moves relative to frame 138).

In examples, frame 138 is configured to at least partially support gate 136 (e.g., via support element 140). In examples, gate 136 is rotationally coupled to frame 138, such that gate 136 may rotate and/or pivot relative to frame 138 (and, e.g., bulkhead 107) when gate 136 transitions between the closed position and the open position. For example, support element 140 may include a pivot joint and/or other component configured to permit gate 136 to rotate around an axis A (e.g., an axis perpendicular to the page) when gate 136 moves relative to frame 138. In other examples, gate 136 may be configured to move in any direction and alter its orientation in any manner relative to frame 138 when gate 136 transitions between the closed position and the open position.

TROV system 104 includes a valve operation system 146 configured to cause outflow valve 106 to establish the open position, establish the closed position, and/or transition between the open position and the closed position. In examples, valve operation system 146 is configured to transfer a driving force (e.g., a linear force, torque, and/or other force) to outflow valve 106 to cause outflow valve 106 to establish the open position, establish the closed position, and/or transition between the open position and the closed position. In examples, valve operation system 146 is configured to transfer the driving force to gate 136 to cause gate 136 to move relative to frame 138. For example, valve operation system 146 may be configured to transfer a driving force to gate 136 to cause gate sealing edge 144 to engage frame sealing edge 142 (e.g., to close outflow valve 106). Valve operation system 146 may be configured to transfer a driving force to gate 136 to cause gate sealing edge 144 to displace from frame sealing edge 142 (e.g., to open outflow valve 106).

CPCS 102 may be configured to communicate with valve operation system 146 (e.g., via communication link 151) to direct valve operation system 146 to transfer the driving force to outflow valve 106. For example, during operation of CPCS 102. CPCS 102 may command valve operation system 146 to drive outflow valve 106 to the closed position or one of one or more open positions to regulate and/or modulate a pressure and/or pressure rate-of-change of cabin atmosphere EC within cabin 103.

Valve operation system 146 may include actuation hardware 150 including one or more components such as linkage 152, linkage 154, and/or other components. In examples, actuation hardware 150 is mechanically coupled to valve motor 148 and/or outflow valve 106 (e.g., gate 136). Valve motor 148 may be operable to supply the driving force (e.g., upon a command received from CPCS 102) to actuation hardware 150. Actuation hardware 150 may be configured to transfer the driving force received from valve motor 148 to outflow valve 106 (e.g., gate 136). Gate 136 may be configured such that, in response to receipt of the driving force, gate 136 moves relative to frame 138 to engage frame 138 (e.g., to close outflow valve 106) or moves relative to frame 138 to establish and/or adjust a displacement from frame 138 (e.g., to position outflow valve 106 in an open position).

In examples, valve operation system 146 may include a motor support 147 configured to couple valve motor 148 to frame 138 and/or another portion of aircraft body 101. In examples, valve operation system 146 includes a motor housing 149 supporting valve motor 148. Motor support 147 may be configured to keep motor housing 149 substantially stationary relative to frame 138 and/or bulkhead 107 when gate 136 moves relative to frame 138. In some examples, frame 138 supports motor support 147. For examples, motor support 147 may be mechanically coupled to and/or a substantially unitary component with frame 138. In some examples, motor support 147 may be mechanically coupled to and/or a substantially unitary component with a portion of aircraft body 101.

As discussed, outflow valve 106 may be configured to define a plurality of open positions wherein the fluid flow F may flow through outflow valve 106 from inlet portion 118 to outlet portion 120. For example, outflow valve 106 may define a fully open position and a plurality of open positions between the fully open position and the closed position. For example, outflow valve 106 may define a fully open position wherein a displacement between gate sealing edge 144 and frame sealing edge 142 is a maximum relative to other open positions of the plurality of open positions. Actuator system 146 (e.g., valve motor 148 and/or actuation hardware 150) may be configured to cause outflow valve 106 (e.g., gate 136) to position in any of the plurality of open positions and/or the closed position. CPCS 102 may be configured to communicate with valve operation system 146 (e.g., via communication link 116) to direct actuator system 146 to position outflow valve 106 in any of the plurality of open positions and/or the closed position. As discussed, when the disclosure herein describes an open position of outflow valve 106, this may refer to any one of the plurality of open positions.

Referring primarily to FIG. 2 and FIG. 3, gate 136 is configured to define a flow passage 156 between gate 136 and frame 138 when outflow valve 106 is in the open position. Gate 136 is configured to define an inflow portion 158 of flow passage 156 configured to receive the fluid flow F. Gate 136 is configured to define an outflow portion 160 of flow passage 156 configured to discharge at least some portion of (e.g., substantially all) the fluid flow F received by inflow portion 158. TROV system 104 may be configured such that outflow portion 160 is fluidically coupled to external environment EXT when outflow valve 106 is mechanically coupled to and/or supported by aircraft body 101. In examples, TROV system 104 is configured such that inflow portion 158 is fluidically coupled to cabin 103 when outflow valve 106 is mechanically coupled to and/or supported by aircraft body 101. In examples, two or more of gate 136 (e.g., first gate portion 135 and/or second gate portion 137), frame 138, shield 145, and/or a second shield (not shown) opposite shield 145 define at least some portion of a boundary of flow passage 156 when outflow valve is in the open position. In examples, a least some portion of inlet portion 118 defines at least some portion of a boundary of flow passage 156 when outflow valve is in the open position.

In the open position, outflow valve 106 is configured to accelerate fluid flow F as fluid flow F flows from inflow portion 158 to outflow portion 160. In examples, gate 136 defines a gate surface 162 configured to cause and/or assist in causing the acceleration of fluid flow F. In examples, frame 138 defines a frame surface 164 configured to cause and/or assist in causing the acceleration of fluid flow F. In examples, gate 136 and/or frame 138 are configured such that gate surface 162 displaces from frame surface 164 when outflow valve 106 defines flow passage 156 (e.g., when outflow valve 106 is in the open position). Outflow valve 106 may be configured such that gate surface 162 and/or frame surface 164 define a convergent section 163 of flow passage 156 and/or a divergent section 165 of flow passage 156. In some examples, gate surface 162 and frame surface 164 define a convergent-divergent cross-sectional shape.

For example, in some examples, as fluid flow F flows in a downstream direction from inflow portion 158 to outflow portion 160 substantially along a flow axis FA defined by outflow valve 106, outflow valve 106 may be configured such that a displacement between gate surface 162 and frame surface 164 decreases in the downstream direction. In examples, at least a cross-section of gate surface 162 defines a curvature relative to first linear axis L1 and/or second linear axis L2. Gate surface 162 may be configured such that the curvature causes the decreasing displacement. The decreasing displacement may reduce a cross-sectional flow area of fluid flow F (e.g., a flow area substantially perpendicular to flow axis FA) as fluid flow F flows along flow axis FA, causing fluid flow F to accelerate. In examples, the convergent section 163 extends through inflow portion 158 to a throat 166 (schematically represented in dashed line) of flow passage 156. Outflow valve 106 may be configured such that a flow area for fluid flow F between gate surface 162 and frame surface 164 is substantially a minimum when fluid flow F passes through throat 166. In some examples, throat 166 separates inflow portion 158 and outflow portion 160.

In some examples, as fluid flow F flows in a downstream direction from inflow portion 158 and/or throat 166 to outflow portion 160 substantially along flow axis FA, outflow valve 106 may be configured such that a displacement between gate surface 162 and frame surface 164 increases in the downstream direction. In examples, the curvature defined by the cross-section of gate surface 162 causes the increasing displacement. The increasing displacement may increase a cross-sectional flow area of fluid flow F (e.g., a flow area substantially perpendicular to flow axis FA) as fluid flow F flows along flow axis FA. In some examples, for example when fluid flow F is substantially sonic at throat 166, the divergent section 165 may be configured to cause acceleration of fluid flow F. In some examples, the divergent section 165 extends substantially from throat 166 and through outflow portion 160. Gate 136 and/or frame 138 may be configured to cause an acceleration of fluid flow F from a subsonic speed within inflow portion 158 to a supersonic speed within outflow portion 160 when outflow valve 106 is in the open position.

Control circuitry 132 is configured to cause obstacle 130 to position in the extended position, position in the retracted position, and/or transition between the extended position and the retracted position. In examples, TROV system 104 includes actuator system 134 configured to receive one or more commands from control circuitry 132 to cause the positioning of obstacle 130. In examples, actuator system 134 includes a motor 168 ("actuator motor 168") and an actuator housing 170 supporting actuator motor 168. In examples, actuator motor 168 is configured to cause obstruction system 128 to position obstacle 130 in the extended position and/or in the retracted position. In examples, actuator housing 170 is coupled (e.g., mechanically coupled) to frame 138. Actuator housing 170 may be configured to remain substantially stationary relative to frame 138 when gate 136 moves relative to frame 138.

Figure 5:
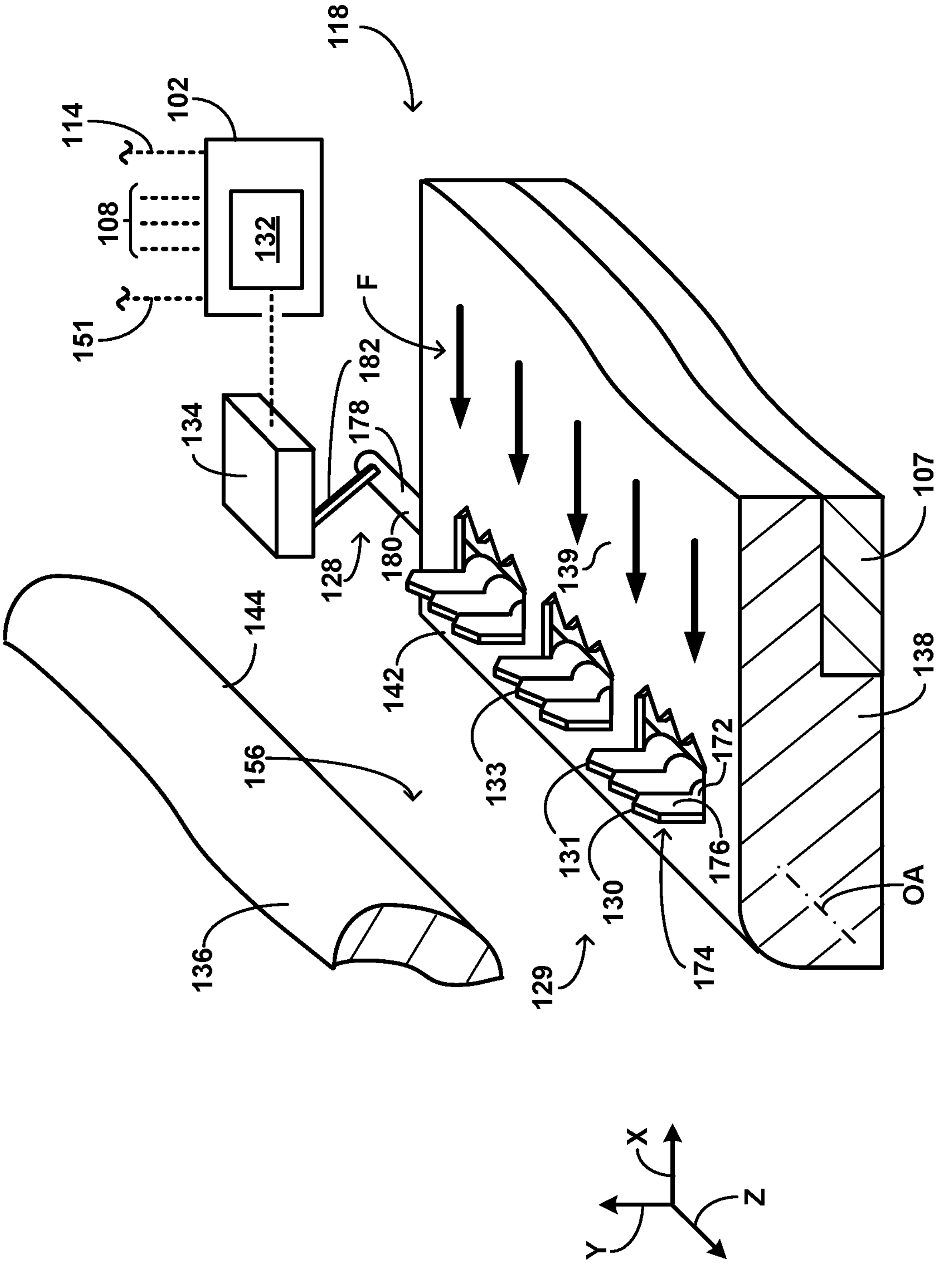
FIG. 5 is a schematic perspective view of an thrust recovery valve system with an obstacle in the extended position.
Figure 6:
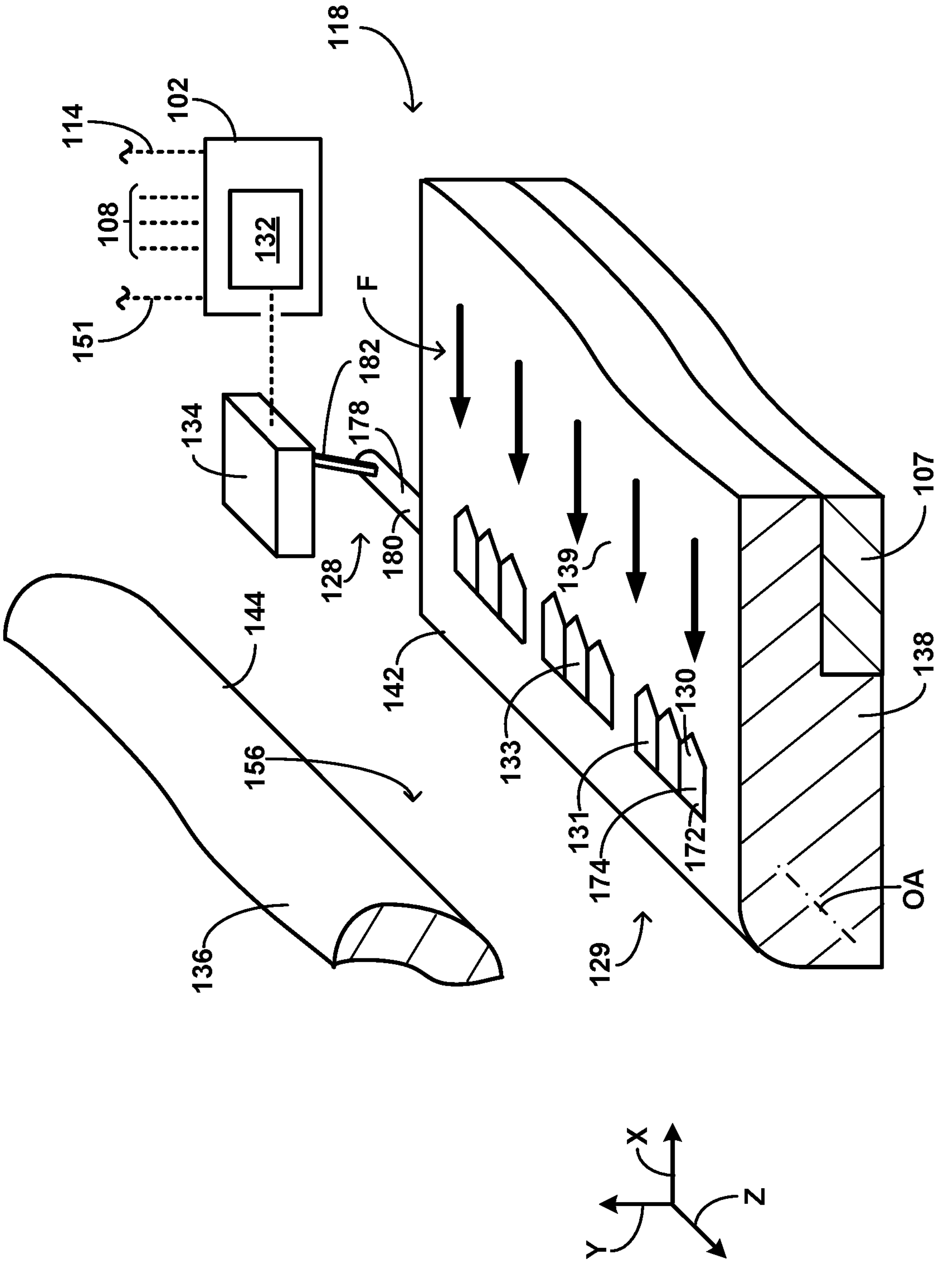
FIG. 6 is a schematic perspective view of the thrust recovery valve system of FIG. 5 with the obstacle in the retracted position.
Figure 7C:
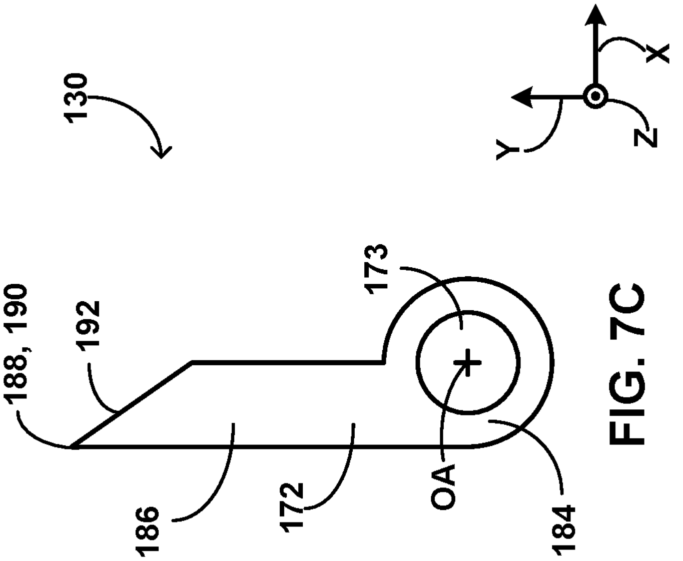
FIG. 7C is a schematic side view of the obstacle of FIG. 7A and FIG. 7B.
Figure 7B:
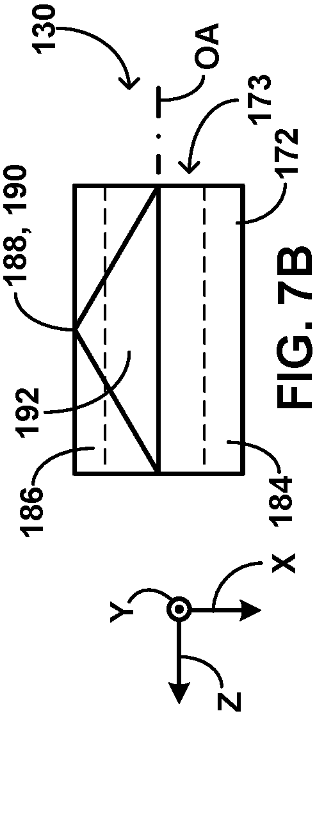
FIG. 7B is a schematic top view of the obstacle of FIG. 7A.
Figure 7A:
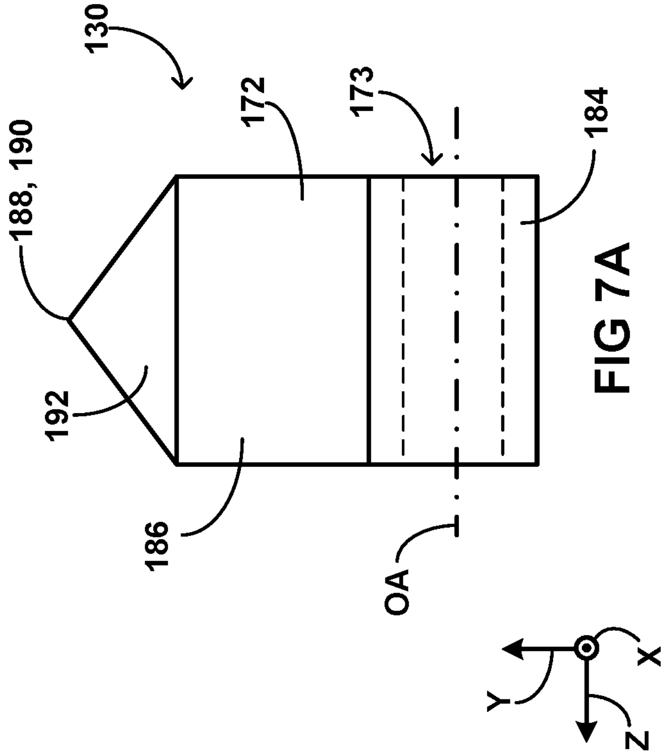
FIG. 7A is a schematic front view of an example obstacle.

FIG. 5 is a schematic perspective illustration of a portion of TROV system 104 with obstacle 130 in the extended position. FIG. 6 is a schematic perspective illustration of the portion of TROV system 104 with obstacle 130 in the retracted position. FIG. 7A is a schematic front view of an example obstacle 130. FIG. 7B is a schematic side view of the obstacle 130 of FIG. 7B. FIG. 7C is a schematic top view of the obstacle 130 of FIG. 7A and FIG. 7B. In FIG. 5 and FIG. 6, portions of gate 136, frame 138, and bulkhead 107 are illustrated as cross-sections, with a cutting plane taken parallel to the page.

TROV system 104 defines wall surface 139. In examples, frame 138 defines wall surface 139. Wall surface 139 is configured to deliver fluid flow F (represented by a plurality of dark arrows in FIG. 5 and FIG. 6) to inflow portion 158 of flow passage 156 defined by outflow valve 106 in the open position. For example, wall surface 139 may be configured to at least partially bound fluid flow F as inflow portion 158 receives fluid flow F. In examples, wall surface 139 define a portion of a boundary configured to direct fluid flow F toward inflow portion 158. In some examples, wall surface 139 may define be a portion of a perimeter surrounding fluid flow F.

In examples, obstacle 130 is one or more of a plurality of obstacles 129 configured to extend from wall surface 139 into fluid flow F when inflow portion 158 receives fluid flow F. For example, the plurality of obstacles may include obstacle 131 and/or obstacle 133 in addition to obstacle 130. Although TROV system 104 is described below mainly with reference to obstacle 130, the descriptions may apply to any obstacle in the of plurality of obstacles 129, including obstacle 131, obstacle 133, and/or another obstacle.

TROV system 104 and/or aircraft body 101 may be configured to cause fluid flow F to flow over wall surface 139 as inflow portion 158 receives fluid flow F. For example, TROV system 104 may be configured to cause fluid flow F to contact wall surface 139 as inflow portion 158 receives fluid flow F. In examples, wall surface 139 is configured such that fluid flow F includes a boundary layer in contact with wall surface 139 as fluid flow F flows over wall surface 139. In some examples, obstacle 130 is configured to extend from wall surface 139 and into the boundary layer in the extended position.

Wall surface 139 is configured to remain substantially stationary with respect to frame 138 when gate 136 moves relative to frame 138 (e.g., when outflow valve 106 transitions between the open position and the closed position). Obstacle 130, when in the extended position of FIG. 5 or in the retracted position of FIG. 6, is configured to remain substantially stationary with respect to wall surface 139 when gate 136 moves relative to frame 138. In examples, wall surface 139 is an acrodynamically smooth surface when fluid flow F is substantially an air flow. For example, wall surface 139 may be configured such that fluid flow F includes a laminar sublayer in proximity to wall surface 139 as fluid flow F flows over wall surface 139. Wall surface 139 may be a surface having an asperity such that an average height of a group of surface asperites defining the asperity is less than a thickness of the laminar sublayer (e.g., a thickness measured perpendicular to wall surface 139). In examples, wall surface 139 is a substantially planar surface. In some examples, wall surface 139 may define a curved or curvilinear surface.

Obstacle 130 is configured to act as a flow obstacle for fluid flow F as inflow portion 158 receives fluid flow F. In examples, when obstacle 130 is in the extended position, obstacle 130 may be configured to cause fluid flow F to establish a velocity vector field wherein one or more streamlines and/or pathlines of fluid flow F avoid and/or flow around obstacle 130. When obstacle 130 is in the retracted position, obstacle 130 may be configured to enable and/or cause fluid flow F to establish a velocity vector field wherein one or more streamlines and/or pathlines flow through a space previously occupied by obstacle 130. In examples, obstacle 130 is configured to reduce generation of a tonal noise caused by fluid flow F in the extended position (as depicted in FIG. 5). Obstacle 130 may be configured to reduce and/or mitigate generation of broadband noise caused by fluid flow F in the retracted position (as depicted in FIG. 6).

Obstacle 130 is configured to move relative to wall surface 139 when obstacle 130 transitions between the extended position and the retracted position. In examples, obstacle 130 is configured to rotate relative to wall surface 139 when obstacle 130 transitions between the extended position and the retracted position. For example, obstacle 130 may define an obstacle axis OA extending through a body 172 of obstacle 130 ("obstacle body 172") and/or extending through a volume define by obstacle body 172. Obstacle 130 may be configured to rotate about obstacle axis OA and relative to wall surface 139 when obstacle 130 transitions between the extended position and the retracted position. In examples, obstacle 130 is configured to rotate over an angle of substantially 90 degrees relative to wall surface 139 when obstacle 130 transitions between the extend position and the retracted position. For example, obstacle 130 may be configured to rotate over an angle of from about 75 degrees to an angle of about 115 degrees relative to wall surface 139 when obstacle 130 transitions between the extend position and the retracted position.

In examples, obstacle 130 is configured to substantially align (e.g., be substantially flush) with wall surface 139 in the retracted position. Obstacle 130 may be configured to substantially align to, for example, provide a relatively smooth area over which fluid flow F flows when obstacle 130 is in the retracted position. In examples, obstacle body 172 defines a surface 174 ("obstacle surface 174) configured to extend from wall surface 139 when obstacle 130 is in the extended position. Obstacle 130 may be configured such that obstacle surface 174 substantially aligns (e.g., is substantially flush) with wall surface 139 when obstacle 130 is in the retracted position. For example, obstacle surface 174 may be configured to be substantially level with wall surface 139 when obstacle 130 is in the extended position (e.g., level or nearly level with wall surface 139 to the extent permitted by manufacturing tolerances).

In some examples, obstacle surface 174 is configured to be a downstream surface (e.g., a trailing surface) when obstacle 130 is in the extended position and fluid flow F flows over wall surface 139 toward inflow portion 158 of flow passage 156. Obstacle body 172 may include a second surface 176 ("second obstacle surface 176") substantially opposite obstacle surface 174. In examples, second obstacle surface 176 is configured to be an upstream surface (e.g., a leading surface) when obstacle 130 is in the extended position and fluid flow F flows over wall surface 139 toward inflow portion 158. In some examples, second obstacle surface 176 is configured such that fluid flow F substantially impinges second obstacle surface 176 when obstacle 130 is in the extended position and fluid flow F flows over wall surface 139 toward inflow portion 158. Obstacle 130 may be configured to extend second obstacle surface 176 into fluid flow F in the extended position and configured to withdraw second obstacle surface 176 from fluid flow F in the retracted position.

For example, as depicted in FIG. 5, in the extended position, obstacle 130 (e.g., obstacle body 172) may be configured to cause second obstacle surface 176 to extend substantially from wall surface 139 into fluid flow F such that, for example, fluid flow F contacts (e.g., impinges) second obstacle surface 176. As depicted in FIG. 6, in the retracted position, obstacle 130 may be configured to cause second obstacle surface 176 to withdraw from fluid flow F such that, for example, fluid flow F and second obstacle surface 176 are substantially separated by some portion of obstacle body 172. In examples, obstacle 130 is configured to withdraw second obstacle surface 176 from fluid flow F when obstacle 130 rotates relative to wall surface 139.

Obstruction system 128 is configured to cause obstacle 130 to move relative to wall surface 139. In examples, obstruction system 128 includes a driver 178 configured to transfer a force and/or torque to obstacle body 172 to cause obstacle 130 to move relative to wall surface 139. Driver 178 may include a driver body 180 coupled to obstacle body 172. Driver body 180 may be configured to transfer the force and/or torque to obstacle body 172 to cause the rotation of obstacle 130. In examples, driver body 180 is an elongate body such as, for example, a body of a shaft.

In some examples, TROV system 104 is configured such that obstacle axis OA extends through driver body 180 when driver body 180 is coupled to obstacle 130. In some examples, driver body 180 is configured such that a rotation of driver body about obstacle axis OA causes rotation of obstacle 130 about obstacle axis OA. In some examples, when driver body 180 rotates about obstacle axis OA, driver body 180 is configured to cause a synchronous rotation of obstacle 130 about obstacle axis OA. Driver body 180 may be configured such that, when driver body 180 rotates about obstacle axis OA, driver body 180 causes the plurality of obstacles 131 to rotate about obstacle axis OA (e.g., to rotate synchronously with driver body 180). In examples, when driver body 180 rotates about obstacle axis OA, driver body 180 is configured to cause a synchronous rotation of each obstacle in the plurality of obstacles 129 about obstacle axis OA.

In some examples, driver body 180 may be a substantially separate component from obstacle body 172 and mechanically coupled to obstacle body 172 by, for example, welding, a fastener, an interference fit, keying, and/or some other component and/or method. In some examples, driver body 180 and obstacle body 172 may comprise a substantially unitary component. In some examples, driver body 180 is configured to extend through a driver access 173 defined by obstacle body 172 (FIGS. 7A-7C). Actuator motor 168 may be configured to cause obstruction system 128 to move obstacle 130 relative to wall surface 139. In examples, actuator motor 168 is configured to transfer an actuating force and/or actuating torque to obstruction system 128 to cause the movement of obstacle 130 relative to wall surface 139. For example, actuator motor 168 may be configured to cause driver body 180 to transfer the force and/or torque causing obstacle 130 to move relative to wall surface 139. Actuator motor 168 (e.g., circuitry of actuator motor 168) may be configured to cause obstruction system 128 to move obstacle 130 relative to wall surface 139 when actuator motor 168 receives a command from control circuitry 132 (e.g., via communication link 116). In examples, actuator motor 168 is configured to cause a rotation of driver body 180 about obstacle axis OA. In some examples, actuator system 134 includes a transfer system 182 (e.g., a mechanical linkage) configured to transfer the actuating force and/or actuating torque to obstruction system 128.

In some examples, obstacle body 172 includes a base portion 184 and an end portion 186. In examples, obstacle body 172 extends from base portion 184 to an obstacle end 188 defined by end portion 186. Obstacle body 172 may be configured to cause obstacle end 188 to move relative to wall surface 139 in a direction away from wall surface 139 when obstacle 130 transitions from the retracted position to the extended position (e.g., driven by obstruction system 128). Obstacle body 172 may be configured to cause obstacle end 188 to move relative to wall surface 139 in a direction toward wall surface 139 when obstacle 130 transitions from the extended position to the retracted position (e.g., driven by obstruction system 128). In examples, base portion 184 defines driver access 173. In examples, driver body 180 is configured to impart a torque on base portion 184 (e.g., a torque received from actuation system 128) to cause obstacle 130 to transition between the extended position and the retracted position. In some examples, obstacle body 172 may substantially defines a "tooth" extending from base portion 184 to obstacle end 188. The plurality of obstacles 131 may substantially define a plurality of teeth.

In some examples, obstacle 130 is configured such that end portion 186 is upstream of base portion 184 when obstacle 130 is in the retracted position and fluid flow F flows in a downstream direction from inlet portion 118 to outlet portion 120 of outflow valve 106. For example, obstacle 130 may be configured such that end portion 186 displaces in a direction away from gate 136, inflow portion 158, and/or convergent section 163 when obstacle 130 transitions from the extended position to the retracted position. This may allow obstacle 130 to establish a closer proximity to inflow portion 158 and/or convergent section 163 when outflow valve 106 assumes the open position and obstacle 130 assumes the extended position, which may increase an effectiveness of obstacle 130 in the reduction of tonal noise caused by fluid flow F. In examples, obstacle 130 is configured such that end portion 186 is in a first position when obstacle 130 is in the extended position and in a second position upstream of the first position when obstacle 130 is in the retracted position. In some examples, end portion 186 is configured such that obstacle end 188 defines an apex 190. In examples, apex 190 is substantially a peak and/or pointed portion of obstacle body 172. In some examples, apex 190 defines a maximum displacement of end portion 186 from base portion 184. For example, obstacle body 172 may define a first axis extending through end portion 186 and parallel to the Z-axis of FIG. 7A. Apex 190 may define a maximum displacement from the first axis in a direction parallel to the Y-axis of FIG. 7A.

In some examples, end portion 186 defines a surface 192 ("end surface 192") configured to enhance a flow of fluid flow F over and/or around obstacle end 188 (e.g., apex 190). For example, surface 192 may be configured to reduce and/or minimize a shear stress experience within fluid flow F when fluid flow F flows over and/or around obstacle end 188. In examples, end surface 92 is configured to slope in a downstream direction of fluid flow F when fluid flow F flows in the downstream direction from inlet portion 118 to outlet portion 120. For example, when fluid flow F flows over wall surface 139 predominantly in a flow direction opposite the X-axis of FIG. 7B, end surface 92 may define a negative slope in the X-Y plane defined by the X-Y-Z axes of FIG. 7B.

Figure 8:
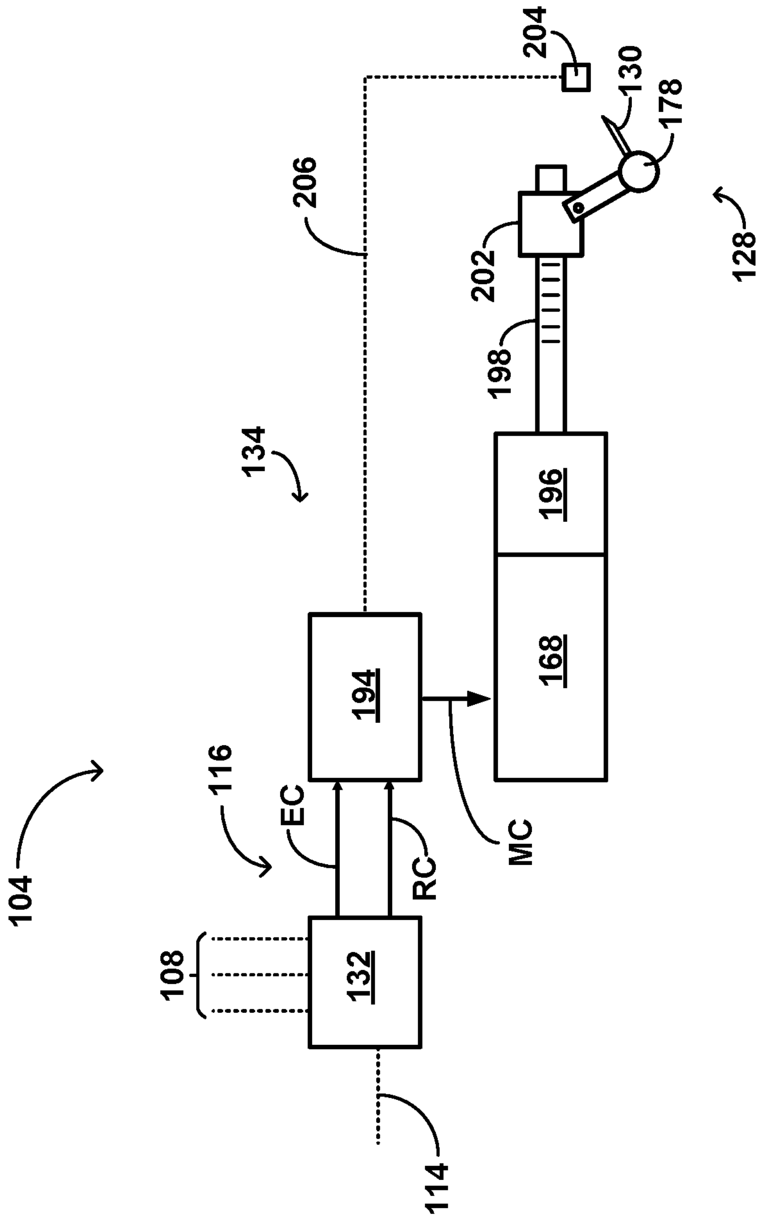
FIG. 8 is a schematic illustration of an example obstruction system and an example actuator system of a thrust recovery valve system.

FIG. 8 illustrates a schematic flow diagram of an example TROV system 104. Control circuitry 132 is configured to receive one or more of a pressure signal (e.g., from pressure sensor 112) via communication link 114 and/or inputs 108. In examples, control circuitry 132 receives the pressure signal and/or inputs 108 from CPCS 102. Control circuitry 132 is configured to determine a pressure parameter indicative of a differential pressure and/or pressure ratio of a fluid flow F flowing from inlet portion 118 of outflow valve 106 to outlet portion 120 of outflow valve 106. Control circuitry is configured to compare the pressure parameter to a parameter threshold. In examples, the parameter threshold is indicative of a range of pressure ratio which includes a pressure ratio of about 1.87.

In examples, actuation system 134 includes one or more of a motor controller 194, actuator motor 168, a gear train 196, a lead screw 198, and/or a drive nut 202. Control circuitry 132 may be configured to issue commands to actuator motor 168 based on a comparison of a pressure parameter and a parameter threshold. For example, control circuitry 132 may be configured to issue an extend command EC to motor controller 194 when the pressure parameter is less than the parameter threshold. Control circuitry 132 may be configured to issue a retract command RC to motor controller 194 when the pressure parameter is greater than or equal to the parameter threshold. Motor controller 194 be configured to issue a motor command ("MC") to actuator motor 168 in response to the extend command EC or the retract command RC. Actuator motor 168 may be configured to generate a motor torque in in response to the motor command MC.

Actuator motor 168 may be configured to transfer the motor torque to gear train 196. In examples, gear train 196 is configured to transfer to the motor torque to lead screw 198 to cause a rotation of lead screw 198. In examples, in response to the extend command EC, motor controller 194 may issue a motor command MC causing actuator motor 168 and/or gear train 196 to transfer a first torque to lead screw 198, causing rotation of lead screw 198 in a first rotational direction. In response to the retract command RC, motor controller 194 may issue a motor command MC causing actuator motor 168 and/or gear train 196 to transfer a second torque (e.g., in a direction opposite the first torque) to lead screw 198, causing rotation of lead screw 198 in a second rotational direction opposite the first rotational direction.

Drive nut 202 may be threadably engaged with lead screw 198. In examples, drive nut 202 is configured such that rotation of lead screw 198 in the first rotational direction causes a translation of drive nut 202 relative to lead screw 198 in a first direction. Drive nut 202 may be configured such that rotation of lead screw 198 in the second rotational direction causes a translation of drive nut 202 relative to lead screw 198 in a second direction opposite the first direction. The translation of drive nut 202 may cause drive nut 202 to transfer a torque and/or force to obstruction system 128 (e.g., driver 178) causing obstacle 130 to establish the extended position, establish the retracted position, and/or transition between the extended position and the retracted position. For example, in response to the extend command EC, actuation system 134 may cause obstacle 130 to establish the extended position and/or transition from the retracted position to the extended position. In response to the retract command RC, actuation system 134 may cause obstacle 130 to establish the retracted position and/or transition from the extended position to the retracted position.

In some examples, TROV system 104 includes a position sensor 204 configured to sense when obstacle 130 is in the extended position, the retracted position, and/or a position substantially between the extended position and the retracted position. Position sensor 204 may be configured to communicate (e.g., via communication link 206) a position signal indicative of the position of obstacle 130 to motor controller 194. Motor controller 194 may be configured to issue and/or cease issuance of the motor command MC in response to the position signal. In some examples, position sensor 204 is configured to communicate the position signal to CPCS 102, control circuitry 132, and/or other circuitry within aircraft 100 to provide an indication of the position of obstacle 130.

Communication link 114, 116, 151, 206, and/or communication links associated with inputs 108 may be hard-line and/or wireless communications links. In some examples, communication link 114, 116, 151, 206, and/or communication links associated with inputs 108 may comprise some portion of CPCS 102 and/or control circuitry 132. In some examples, communication link 114, 116, 151, 206, and/or communication links associated with inputs 108 comprise a wired connection, a wireless Internet connection, a direct wireless connection such as wireless LAN, Bluetooth™, Wi-Fi™, and/or an infrared connection. Communication link 114, 116, 151, 206, and/or communication links associated with inputs 108 may utilize any wireless or remote communication protocol.

In examples, CPCS 102, control circuitry 132, and/or motor controller 194 may include any one or more of a microcontroller (MCU), e.g., a computer on a single integrated circuit containing a processor core, memory, and programmable input/output peripherals, a microcontroller (μP), e.g., a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Pressure sensor 112 may be any device configured to provide a pressure signal indicative of a pressure of a fluid. Pressure sensor 112 may be configured to use any type of force collector to sense the pressure of the gas stream including, for example, diaphragms, pistons, bourdon tubes, bellows, or some other collector. Pressure sensor 112 may transduce the pressure into an electrical signal using, for example, piezoresistive strain gauges, capacitors, electromagnets, optical fibers, potentiometric wipers, or other devices. Pressure sensor 112 may be configured to sense an absolute pressure or a gauge pressure. The signal indicative of the pressure generated by pressure sensor 112 may be an analog electrical signal or a digital signal. Pressure sensor 112 may include processing circuitry configured to generate the signal indicative of the pressure, and may be configured to communicate the signal indicative of the pressure to other devices in data communication with pressure sensor 112.

Position sensor 204 may be any device configured to sense a position of obstacle 130 (e.g., the extended position, the retracted position, and/or a position between the extended position and the retracted position). Position sensor 204 may include any type of component configured to sense a position, including one or more reed switches, one or more limit switches, one or more potentiometer position sensors, one or more linear variable differential transformer/voltage displacement (LVDT) transducers, one or more hall-effect magnetic sensors, and/or other proximity switches, and may include mechanically actuated components such as mechanical switches, mechanical counters, cams, actuating arms, and the like.

As used here, when a first component of a system (e.g., TROV system 104) is stationary and/or substantially stationary relative to a second component of the system, this means the first component is stationary with respect to the second component except for incidental movements and/or vibrations experienced by the first component and/or second component and arising from operations of TROV system 104 described herein.

As used here, when a first portion of the system supports a second portion of the system, this means that when the second portion causes a first force to be exerted on the first portion, the first portion causes a second force to be exerted on the second portion in response to the first force. The first force and/or second force may be a contact force and/or an action-at-a-distance force. For example, first force and/or second force may be mechanical force, a magnetic force, a gravitational force, or some other type of force. The first portion of the system may be a portion of the system or a portion of a component of the system. The second portion of the system may be another portion of the system or another portion of the same component or a different component. In some examples, when the first portion of the system supports the second portion of the system, this may mean the second portion is mechanically supported by and/or mechanically connected to the first portion.

Figure 9:
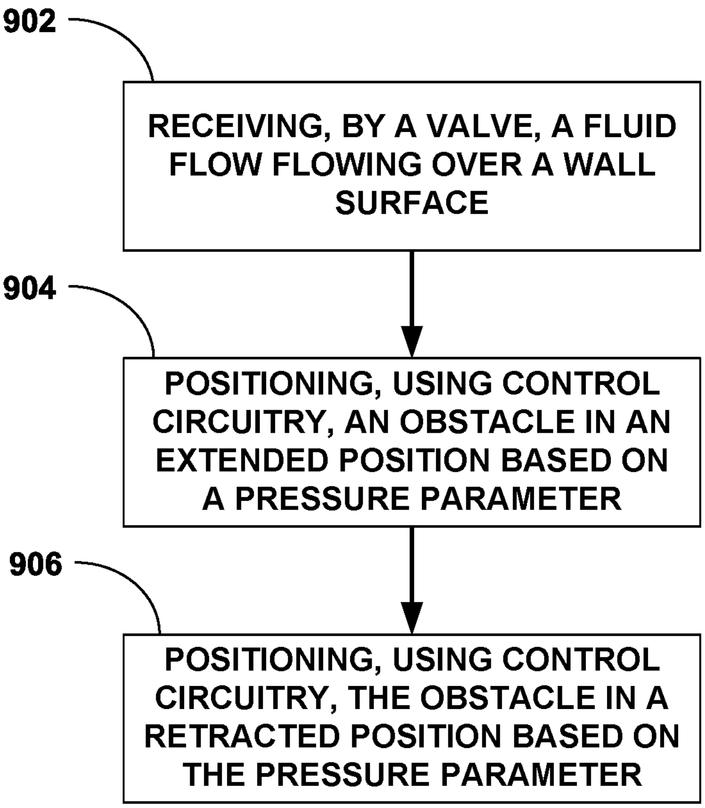
FIG. 9 is a flow diagram illustrating an example method of operating a thrust recovery valve system.

FIG. 9 illustrates a flow diagram of an example technique for discharging a fluid using a thrust recovery valve system through an outflow valve. Although the technique is mainly described with reference to TROV system 104 and the components thereof (FIGS. 1-8), the technique may be used with other systems in other examples. In addition, control circuitry 132 alone or in combination with control circuitry of other devices can perform any part of the technique shown in FIG. 9.

The technique include receiving a fluid flow F flowing over a wall surface 139 at an outflow valve 106 (902). In examples, outflow valve 106 receive fluid flow F at an inlet portion 118 and discharges fluid flow F at an outlet portion 120. Inlet portion 118 may be fluidically coupled to a cabin 103 supported by an aircraft body 101 of an aircraft 100. Outlet portion 120 may be fluidically coupled to an external environment EXT surrounding aircraft body 101.

In examples, outflow valve 106 receives fluid flow F in an inflow portion 158 of a flow passage 156 defined by outflow valve 106. Outflow valve 106 may discharge fluid flow F from an outflow portion 160 of flow passage 156. In examples, outflow valve 106 accelerate fluid flow F as fluid flow F flows through flow passage 156 from inflow portion 158 to outflow portion 160. In examples, outflow valve 106 transfers a thrust to aircraft body 101 generated by the acceleration of fluid flow F. Outflow valve 106 may define flow passage 156 using a gate 136 of outflow valve 106 and a frame 138 of outflow valve 106. In examples, frame 138 is coupled to and/or supported by a portion of aircraft body 101. In examples, gate 136 displaces away from or toward frame 138 to define flow passage 156. In examples, CPCS 102 issues one or more commands causing gate 136 to displace away from or toward frame 138.

The technique includes positioning, using control circuitry 132, an obstacle 130 in an extended position based on a valve of a pressure parameter (904). In examples, the pressure parameter is indicative of a first pressure (e.g., a pressure of fluid flow F) at inflow portion 158 compared to a second pressure (e.g., a pressure of external environment EXT) at outflow portion 160. In examples, the pressure parameter is indicative of a differential pressure and/or pressure ratio determined using the first pressure and the second pressure. Control circuitry 132 and/or CPCS 102 may determine the pressure parameter using a pressure signal from a pressure sensor 112, one or more of inputs 108, and/or other data. Control circuitry 132 may cause obstacle 130 to position in the extended position when the pressure parameter is less than a parameter threshold. The technique includes positioning, using control circuitry 132, obstacle 130 in a retracted position when the pressure parameter is greater than or equal to the parameter threshold (906).

In examples, positioning obstacle 130 in the extended position includes causing obstacle 130 to extend from wall surface 139 into fluid flow F. Positioning obstacle 130 in the retracted position includes withdrawing obstacle 130 from fluid flow F. In examples, obstacle 130 moves (e.g., rotates) relative to wall surface 139 when obstacle 130 transitions between the extended position and the retracted position. In examples, when obstacle 130 is in the extended position or the retracted position, gate 136 moves relative to obstacle 130 when gate 136 displaces away from or toward frame 138. In examples, frame 138 defines wall surface 139, and gate 136 moves relative to wall surface 139 when gate 136 displaces away from or toward frame 138.

In some examples, control circuitry 132 directs an actuator system 134 to cause obstacle 130 to position in the extended position, position in the retracted position, and/or transition between the extended position and the retracted position. In some examples, an actuator motor 168 of actuator system 134 may transfer a torque or force to an obstruction system 128 to cause obstacle to position in the extended position, position in the retracted position, and/or transition between the extended position and the retracted position. Frame 138 may support an actuator housing 170 supporting actuator motor 168 when actuator motor 168 transfer the torque or force. In examples, gate 136 moves relative to actuator housing 170 when gate 136 displaces away from or toward frame 138.

The techniques described in this disclosure, including those attributed to control circuitry 132, CPCS 102, and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A system comprising: a valve comprising a gate, wherein the gate is configured to contact a frame when the valve is in a closed position and configured to displace away from the frame when the valve is in an open position, and wherein, in the open position, the valve defines a flow passage including an inflow portion of the flow passage and an outflow portion of the flow passage, the inflow portion configured to receive a fluid flow and the outflow portion configured to discharge the fluid flow; a wall surface, wherein the wall surface is configured to deliver the fluid flow to the inflow portion when the valve is in the open position and the fluid flow flows over the wall surface, and wherein the wall surface is configured to remain stationary with respect to the frame when the gate displaces from the frame; an obstacle configured to position in an extended position and position in a retracted position, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position; and control circuitry configured to: determine a pressure parameter, wherein the pressure parameter is indicative of a pressure of the fluid flow at the inflow portion compared to a pressure of the fluid flow at the outflow portion, cause the obstacle to position in the extended position when the pressure parameter is less than a parameter threshold, and cause the obstacle to position in the retracted position when the pressure parameter is greater than or equal to the parameter threshold.

Example 2: The system of example 1, further comprising the frame, wherein at least one of the gate or the frame are configured to define a convergent section of the flow passage, and wherein at least one of the gate or the frame are configured to define a divergent section of the flow passage, the convergent section configured to receive the fluid flow from the inflow portion and the divergent section configured to discharge the fluid flow to the outflow portion.

Example 3: The system of example 1 or example 2, wherein the gate is configured to cause an acceleration of the fluid flow from a subsonic speed at the inflow portion to a supersonic speed at the outflow portion when the gate displaces away from the frame and the outflow portion discharges the fluid flow.

Example 4: The system of any of examples 1-3, wherein the pressure parameter is indicative of a ratio of the pressure of the fluid flow at the inflow portion compared to the pressure of the fluid flow at the outflow portion.

Example 5: The system of example 4, wherein the ratio is indicative of the pressure of the fluid flow at the inflow portion divided by the pressure of the fluid flow at the outflow portion, and wherein the parameter threshold is indicative of a range of ratios that includes a ratio of about 1.87.

Example 6: The system of any of examples 1-5, wherein the obstacle defines an obstacle surface configured to extend into the fluid flow when the fluid flow flows over the wall surface and the obstacle is in the extended position, and wherein the obstacle surface is configured to align with the wall surface when the fluid flow flows over the wall surface and the obstacle is in the retracted position.

Example 7: The system of any of examples 1-6, wherein the obstacle is configured to rotate relative to the wall surface when the obstacle transitions between the extended position and the retracted position.

Example 8: The system of any of examples 1-7, further comprising the frame, wherein the gate is pivotably attached to the frame.

Example 9: The system of example 8, wherein the frame defines the wall surface.

Example 10: The system of any of examples 1-9, wherein the control circuitry is configured to: determine a cabin pressure in a cabin of an aircraft, determine an external pressure external to the aircraft, determine the pressure of the fluid flow at the inflow portion using the cabin pressure, and determine the pressure of the fluid flow at the outflow portion using the external pressure.

Example 11: The system of any of examples 1-10, further comprising an actuator system including a housing supporting a motor, wherein: the control circuitry is configured to command the actuator system to cause the obstacle to position in the extended position and command the actuator system to cause the obstacle to position in the retracted position, the actuator system is configured to cause the obstacle to position in the extended position using the motor and configured to cause the obstacle to position in the extended position using the motor, and the housing is configured to remain substantially stationary relative to at least one of the wall surface or the frame when the valve transitions between the open position and the closed position.

Example 12: The system of example 11, further comprising the frame, wherein the housing is coupled to the frame, and wherein the housing is configured to remain substantially stationary relative to the frame when the valve transitions between the open position and the closed position.

Example 13: The system of any of examples 1-12, further comprising a driver configured to rotate about an axis relative to the wall surface, wherein the obstacle is configured to rotate synchronously with the driver, and wherein the driver is configured to transition the obstacle between the extended position and the retracted position when the driver rotates relative to the wall surface.

Example 14: The system of example 13, wherein the gate is configured to move relative to the driver when the valve transitions between the open position and the closed position.

Example 15: The system of any of examples 1-14, wherein the obstacle comprises a plurality of teeth, wherein each tooth in the plurality of teeth is configured to extend from the wall surface into the fluid flow when the obstacle positions in the extended position.

Example 16: A system comprising: a frame defining a wall surface; a valve comprising a gate pivotably coupled to the frame, wherein the valve is configured to seat against the frame when the valve is in a closed position and configured to displace away from the frame when the valve is in an open position, wherein, when the valve is in the open position, the gate and the frame are configured to define a flow passage including an inflow portion of the flow passage configured to receive an fluid flow and an outflow portion of the flow passage configured to discharge the fluid flow, wherein the gate and the frame are configured to accelerate the fluid flow to a supersonic speed when the outflow portion discharges the fluid flow, and wherein the wall surface is configured to deliver the fluid flow to the inflow portion when the valve is in the open position and the fluid flow flows over the wall surface; an obstacle configured to position in an extended position and configured to position in a retracted position, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position; and; an actuator system including a housing supporting a motor, the motor configured to cause the obstacle to position in the extended position and cause the obstacle to position in the retracted position, wherein the motor housing is coupled to the frame; and control circuitry configured to: determine a pressure parameter, wherein the pressure parameter is indicative of a pressure of the fluid flow at the inflow portion compared to a pressure of the fluid flow at the outflow portion, command the actuator system to the motor to position the obstacle in the extended position when the pressure parameter is less than a parameter threshold, and command the actuator system to the motor to position the obstacle in the retracted position when the pressure parameter is greater than or equal to the parameter threshold.

Example 17: The system of example 16, wherein the control circuitry is configured to: determine a cabin pressure in a cabin of an aircraft, determine an external pressure external to the aircraft, determine the pressure of the fluid flow at the inflow portion using the cabin pressure, and determine the pressure of the fluid flow at the outflow portion using the external pressure.

Example 18: The system of example 16 or example 17, wherein the obstacle comprises a plurality of teeth, wherein each tooth in the plurality of teeth is configured to extend from the wall surface into the fluid flow when the obstacle is positioned in the extended position.

Example 19: A method comprising: defining, using a valve, an inflow portion of a flow passage and an outflow portion of the flow passage by displacing a gate of the valve from a frame, wherein the gate is configured to seat against the frame when the valve is in a closed position and displace away from the frame when the valve is in an open position; delivering, using a wall surface, a fluid flow flowing over the wall surface to the inflow portion when the valve is in the open position; discharging, using the outflow portion, the fluid flow received at the inflow portion; determining, using control circuitry, a pressure parameter indicative of a pressure of the fluid flow at the inflow portion compared to a pressure of the fluid flow at the outflow portion; and causing, using the control circuitry, an obstacle to position in an extended position when the pressure parameter is less than a parameter threshold and position in a retracted position when the pressure parameter is greater than or equal to the parameter threshold, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position.

Example 20: The method of example 19, further comprising: supporting, using the frame, the gate, wherein the gate is pivotably coupled to the frame; and supporting, using the frame, a housing supporting a motor, wherein the motor is configured to cause the obstacle to position in the extended position and cause the obstacle to position in the retracted position, and wherein the housing is configured to remain substantially stationary relative to the wall surface when the valve is in the open position and when the valve is in the closed position.

Various examples have been described. These and other examples are within the scope of the following claims.

What is claimed is:

1. A system comprising:

a frame configured to mount to a body of an aircraft and remain fixed to the body of the aircraft;

a valve comprising a gate, wherein the gate is pivotally attached to the frame and configured to contact the frame when the valve is in a closed position and configured to displace away from the frame when the valve is in an open position, and wherein, in the open position, the valve defines a flow passage including an inflow portion of the flow passage and an outflow portion of the flow passage, the inflow portion configured to receive a fluid flow and the outflow portion configured to discharge the fluid flow;

a wall surface, wherein the wall surface is configured to deliver the fluid flow to the inflow portion when the valve is in the open position and the fluid flow flows over the wall surface, and wherein the wall surface is configured to remain stationary with respect to the frame when the gate displaces from the frame;

an obstacle configured to position in an extended position and position in a retracted position, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position; and control circuitry configured to:

determine a pressure parameter, wherein the pressure parameter is indicative of a pressure of the fluid flow at the inflow portion compared to a pressure of the fluid flow at the outflow portion, cause the obstacle to position in the extended position when the pressure parameter is less than a parameter threshold, and cause the obstacle to position in the retracted position when the pressure parameter is greater than or equal to the parameter threshold.

2. The system of claim 1, wherein at least one of the gate or the frame is configured to define a convergent section of the flow passage, and wherein at least one of the gate or the frame is configured to define a divergent section of the flow passage, the convergent section configured to receive the fluid flow from the inflow portion and the divergent section configured to discharge the fluid flow to the outflow portion.

3. The system of claim 1, wherein the gate is configured to cause an acceleration of the fluid flow from a subsonic speed at the inflow portion to a supersonic speed at the outflow portion when the gate displaces away from the frame and the outflow portion discharges the fluid flow.

4. The system of claim 1, wherein the pressure parameter is indicative of a ratio of the pressure of the fluid flow at the inflow portion compared to the pressure of the fluid flow at the outflow portion.

5. The system of claim 4, wherein the ratio is indicative of the pressure of the fluid flow at the inflow portion divided by the pressure of the fluid flow at the outflow portion, and wherein the parameter threshold is indicative of a range of ratios that includes a ratio of about 1.87.

6. The system of claim 1, wherein the obstacle defines an obstacle surface configured to extend into the fluid flow when the fluid flow flows over the wall surface and the obstacle is in the extended position, and wherein the obstacle surface is configured to align with the wall surface when the fluid flow flows over the wall surface and the obstacle is in the retracted position.

7. The system of claim 1, wherein the obstacle is configured to rotate relative to the wall surface when the obstacle transitions between the extended position and the retracted position.

8. The system of claim 1, wherein the gate is pivotably attached to the frame, and wherein the frame defines the wall surface.

9. The system of claim 1, wherein the control circuitry is configured to:

determine a cabin pressure in a cabin of the aircraft, determine an external pressure external to the aircraft, determine the pressure of the fluid flow at the inflow portion using the cabin pressure, and determine the pressure of the fluid flow at the outflow portion using the external pressure.

10. The system of claim 1, further comprising an actuator system including a housing supporting a motor, wherein:

the control circuitry is configured to command the actuator system to cause the obstacle to position in the extended position and command the actuator system to cause the obstacle to position in the retracted position, the actuator system is configured to cause the obstacle to position in the extended position using the motor and configured to cause the obstacle to position in the retracted position using the motor, and the housing is configured to remain substantially stationary relative to at least one of the wall surface or the frame when the valve transitions between the open position and the closed position.

11. The system of claim 10, wherein the housing is coupled to the frame, and wherein the housing is configured to remain substantially stationary relative to the frame when the valve transitions between the open position and the closed position.

12. The system of claim 1, further comprising a driver configured to rotate about an axis relative to the wall surface, wherein the obstacle is configured to rotate synchronously with the driver, and wherein the driver is configured to transition the obstacle between the extended position and the retracted position when the driver rotates relative to the wall surface.

13. The system of claim 12, wherein the gate is configured to move relative to the driver when the valve transitions between the open position and the closed position.

14. The system of claim 1, wherein the obstacle comprises a plurality of teeth, and wherein each tooth in the plurality of teeth is configured to extend from the wall surface into the fluid flow when the obstacle positions in the extended position.

15. A system comprising:

a frame defining a wall surface and configured to mount to a body of an aircraft and remain fixed to the body of the aircraft;

a valve comprising a gate pivotably coupled to the frame, wherein the valve is configured to seat against the frame when the valve is in a closed position and configured to displace away from the frame when the valve is in an open position, wherein, when the valve is in the open position, the gate and the frame are configured to define a flow passage including an inflow portion of the flow passage configured to receive a fluid flow and an outflow portion of the flow passage configured to discharge the fluid flow, wherein the gate and the frame are configured to accelerate the fluid flow to a supersonic speed when the outflow portion discharges the fluid flow, and wherein the wall surface is configured to deliver the fluid flow to the inflow portion when the valve is in the open position and the fluid flow flows over the wall surface;

an obstacle configured to position in an extended position and configured to position in a retracted position, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position; and;

an actuator system including a housing supporting a motor, the motor configured to cause the obstacle to position in the extended position and cause the obstacle to position in the retracted position, wherein the housing is coupled to the frame; and control circuitry configured to:

determine a pressure parameter, wherein the pressure parameter is indicative of a pressure of the fluid flow at the inflow portion compared to a pressure of the fluid flow at the outflow portion, command the actuator system to cause the motor to position the obstacle in the extended position when the pressure parameter is less than a parameter threshold, and command the actuator system to cause the motor to position the obstacle in the retracted position when the pressure parameter is greater than or equal to the parameter threshold.

16. The system of claim 15, wherein the control circuitry is configured to:

determine a cabin pressure in a cabin of the aircraft, determine an external pressure external to the aircraft, determine the pressure of the fluid flow at the inflow portion using the cabin pressure, and determine the pressure of the fluid flow at the outflow portion using the external pressure.

17. The system of claim 15, wherein the obstacle comprises a plurality of teeth, wherein each tooth in the plurality of teeth is configured to extend from the wall surface into the fluid flow when the obstacle is positioned in the extended position.

18. A method comprising:

defining, using a valve, an inflow portion of a flow passage and an outflow portion of the flow passage by displacing a gate of the valve from a frame, wherein the gate is configured to seat against the frame when the valve is in a closed position and displace away from the frame when the valve is in an open position, and wherein the frame is mounted to a body of an aircraft and remains fixed to the body of the aircraft;

delivering, using a wall surface, a fluid flow flowing over the wall surface to the inflow portion when the valve is in the open position;

discharging, using the outflow portion, the fluid flow received at the inflow portion;

determining, using control circuitry, a pressure parameter indicative of a pressure of the fluid flow at the inflow portion compared to a pressure of the fluid flow at the outflow portion; and causing, using the control circuitry, an obstacle to position in an extended position when the pressure parameter is less than a parameter threshold and position in a retracted position when the pressure parameter is greater than or equal to the parameter threshold, wherein the obstacle is configured to extend at least a portion of the obstacle from the wall surface into the fluid flow flowing over the wall surface in the extended position, and wherein the obstacle is configured to retract the portion of the obstacle out of the fluid flow flowing over the wall surface in the retracted position.

19. The method of claim 18, further comprising:

supporting, using the frame, the gate, wherein the gate is pivotably coupled to the frame; and supporting, using the frame, a housing supporting a motor, wherein the motor is configured to cause the obstacle to position in the extended position and cause the obstacle to position in the retracted position, and wherein the housing is configured to remain substantially stationary relative to the wall surface when the valve is in the open position and when the valve is in the closed position.

* * * * *